(12) United States Patent
Hayashi et al.

(10) Patent No.: US 6,404,778 B1
(45) Date of Patent: Jun. 11, 2002

(54) RADIO COMMUNICATION APPARATUS

(75) Inventors: Masaki Hayashi, Yokosuka; Kazuyuki Miya, Kawasaki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/159,602

(22) Filed: Sep. 24, 1998

(51) Int. Cl.[7] ................. H04J 3/16; H04J 3/22
(52) U.S. Cl. ............. 370/470; 370/280; 370/294; 370/329; 370/468
(58) Field of Search ................ 370/277, 278, 370/280, 282, 294, 329, 330, 335, 340, 341, 342, 347, 348, 442, 443, 465, 468, 470, 472

(56) References Cited

U.S. PATENT DOCUMENTS

| | | | | |
|---|---|---|---|---|
| 5,628,052 A | * | 5/1997 | DeSantis et al. | 370/334 |
| 5,732,073 A | * | 3/1998 | Kusaki et al. | 370/280 |
| 5,802,110 A | * | 9/1998 | Watanabe et al. | 375/133 |
| 5,850,393 A | * | 12/1998 | Adachi | 370/335 |
| 5,875,208 A | * | 2/1999 | Hoole | 370/280 |
| 6,047,015 A | * | 4/2000 | Watanabe et al. | 375/132 |

* cited by examiner

*Primary Examiner*—David Vincent
*Assistant Examiner*—Bob A. Phunkulh
(74) *Attorney, Agent, or Firm*—Greenblum & Bernstein, P.L.C.

(57) ABSTRACT

In a mobile station apparatus and a base station apparatus in a digital mobile communication using a TDD system and a CDMA system, in the case where there is a difference in communication qualities between a revere link and a forward Link, a burst length of a communication link with lower quality can be made longer than a burst length of a communication link with higher quality. That makes it possible to communicate more signals in the communication link with low communication quality than in the communication link with high communication quality, which allows the equal communication qualities in the reverse link and the forward link.

24 Claims, 25 Drawing Sheets

RADIO COMMUNICATION APPARATUS

BACKGROUND OF THE INVENTION

1. Field of the Invention

The present invention relates to a digital mobile communication apparatus using a time division duplex system and a code division multiple access system.

2. Description of the Related Art

In a time division duplex (TDD) system, the same frequency band is used in a reverse link (link from a mobile station to a base station) and in a forward link (link from a base station to a mobile station), called a ping-pong system, and a communication is performed alternately by dividing the time for a reverse link and for a forward link on the same radio frequency band. As shown in the thesis of "Micro/Pico cellular Communication and Network Construction" written by Nakajima (The sixth Circuit and System; Karuizawa Workshop pp. 121–126, Apr. 19–20, 1993), it is known as a benefit of a TDD system that no space diversity is necessary in a mobile station, which results in the downsizing of a mobile station, because a transmission diversity can be applied in a base station.

A communication path propagated radio wave varies by the fading that is a factor to deteriorate the communication. As a technology to reduce the effect caused by the fading described above to achieve the high quality communication, there is reception diversity using more than two received waves. The reception diversity is one of the diversity technologies described above, and to obtain a plurality of fading received waves each having an independent fluctuation using more than two reception antenna separated away enough in a space. On the other hand, the transmission diversity is to estimate a communication path condition of a reception band for each antenna using the received wave in the reception diversity, and perform the transmission from an antenna estimated to be under the good communication condition. In a TDD system using the same frequency band for a reverse link and a forward link, the frequency characteristics depending on the fading fluctuation in a reverse link and a forward link is equal, and it is assumed that the Lime sameness property of fading fluctuations for a reverse link and a forward link is high when the switching time for both links are short enough. Because of It, by applying the transmission diversity, it is relatively easy to reduce the effect on a transmission wave caused by the fading fluctuation, which allows the high path communication quality for each channel.

As a conventional digital communication mode using a TDD system, PHS (Personal Handy PhoneSystem) that is a digital cordless phone system in Japan is known. PHS is a digital mobile communication system in a TDD system using a time division multiple access (TDMA) as a multiple access system. In a time division multiple access, the used time is divided in a radio frequency, the specific time slot is assigned to a user, and each user performs a communication in the assigned time slot.

FIG. 1 illustrates a exemplary frame configuration in a TDD system in a digital mobile communication system. A frame is composed of a reverse link burst and a forward link burst. Frame length 2500 is a sum of reverse link burst length 2510 and forward link burst length 2520. A reverse link burst is composed of reverse link communication control bits 2511, reverse link user information bits 2512, and reverse link error correction bits 2513. A forward link burst is composed of forward link communication control bits 2511, forward link user information bits 2512, and forward link error correction bits 2513.

Communication control bits are composed of guard time bits inserted to prevent a reverse link and a forward link from collision caused by propagation delay, unique word bits to acquire and hold the frame synchronization and so on. The number of reverse link communication control bits is referred to Cr, and the number of forward link communication control bits is referred to Cf.

User information bits include, for instance, information data of coded voice in a phone, and information data of coded image in a facsimile. The number of reverse link user information bits is referred to Ir, and the number of forward link user information its is referred to If.

Error correction bits are information bits to detect an information error caused on a transmission path and to correct the error so as to transmit information bits without an error in a communication link of low transmitted path communication quality. By inputting user information bits through an error correction coder, a series of error correction coded data (user information bits and error correction bits; however error correction coded data can not be separated distinctly into user information bits and error correction bits in convolution codes or the like) is generated. When an error occurs in error correction coded data in a transmission path, a reception side can estimate original user information bits using a pattern of received error correction coded data to reproduce. The number of reverse link error correction bits is referred to Fr, and the number of forward link error correction bits is referred to Ff.

In the conventional technology, reverse link burst length 2510 and forward link burst length 2520 are equal, and the numbers of communication control bits, user information bits or error correction bits in a reverse link and a forward link are also equal. Namely, Cr=Cf, Ir=If and Fr=Ff.

However, in a conventional digital mobile communication using a TDD system described above, the path communication quality difference between a reverse link and a forward link generates depending on the utilization environment. Because of it, for instance, in the case where the path communication quality of a forward link is lower than that of a reverse link, the problem occurs that the lower path communication quality of the forward link limits the entire path communication quality even when the path communication quality of the reverse link is high. Arid as described previously, in a TDD system, the space diversity is applied for the transmission and the reception in a base station by using the sameness property of transmission path condition of a reverse link and a forward link. In a reception diversity in the reverse link, since it is easy to perform the maximal-ratio combining of a received signal in each antenna branch, it is possible to obtain the large diversity effect. In the transmission diversity in the reverse link, a branch to transmit is selected when transmission phase correction is not performed. And even when the phase correction is performed, the effect of the transmission diversity is lower than that of the reception diversity because the transmission diversity is performed by assuming the transmission path condition. Accordingly, when the number of antenna set in a base station is increased, the path communication quality of the reverse link is largely improved, but the path communication quality of the forward link is not improved as largely as the reverse link. Generally in a CDMA system, since the path communication quality depends on the user capacity, the number of antennas in a base station may be determined according to the traffic of a cell, and it may occur that the difference of path communication quality between a reverse link and a forward link differs in cells.

SUMMARY OF THE INVENTION

The present invention is Lo solve the above problems. It is an object of the present invention to provide a digital mobile communication apparatus having high system capacity, which can improve the communication quality of a communication link of lower communication quality to achieve equal communication qualities of user information in the reverse link and the forward link equal.

In a digital mobile communication using a TDD system and a CDMA system in the present invention, in the case where the communication quality of the reverse link is higher than that of the forward link, the apparatus makes the error correction capability of the forward link higher than that of the reverse link by making a burst length of the forward link longer than that of the reverse link. And in the case where the communication quality of the forward link is higher than that of the reverse link, the apparatus makes the error correction capability of the reverse link higher than that of the forward link by making a burst length of the reverse link longer than that of the forward link. Thus, it is possible to improve the communication quality of the communication link of lower communication quality to achieve equal communication qualities of user information in the reverse link and the forward link equal, which results in the excellent digital mobile communication service with high system capacity.

DETAILED DESCRIPTION OF THE PREFERRED EMBODIMENTS

Figure 2:
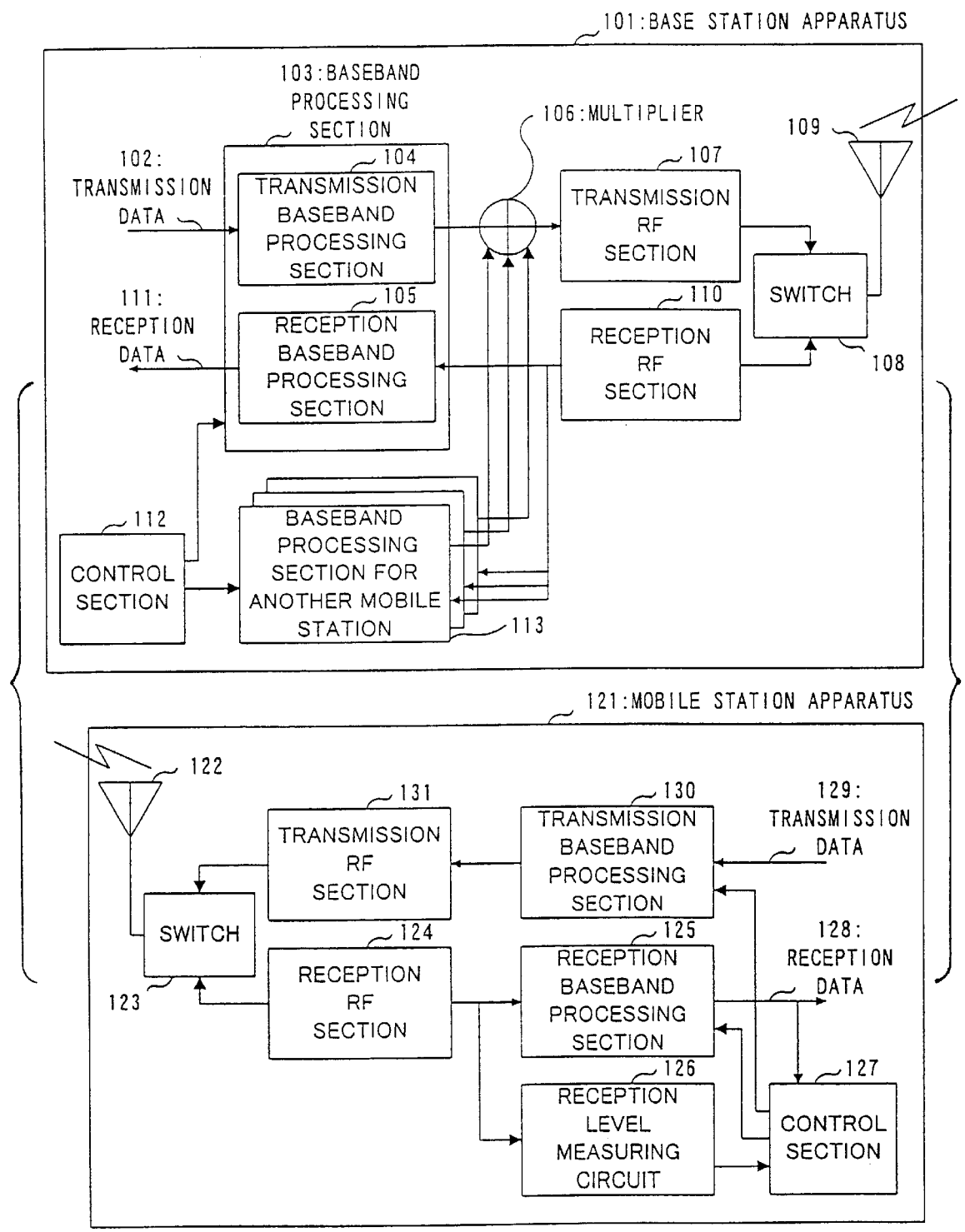
FIG. 2 a diagram illustrating configurations of a base station apparatus and a mobile station apparatus in a digital mobile communication system using a TDD system and a CDMA system in the embodiments of the present invention.

The embodiments of the present invention are explained below with reference to drawings. FIG. 2 illustrates schematic configurations of a base station apparatus and a mobile communication apparatus in the embodiments of the present invention. Only the operation of a control section is different from that in a conventional apparatus. The operation in base station apparatus 101 in communicating is as follows. Transmission data 102 to a certain mobile station is inputted to baseband processing section 103. Baseband processing section 103 is composed of transmission baseband processing section 104 and reception baseband processing section 105, and controlled over a control signal from control section 112. Transmission data 102 inputted to baseband processing section 103 is coded for a path in transmission baseband processing section 104, modulated and spread with a spreading code, and outputted to multiplier 106. Multiplier 106 multiplies an output from transmission basbasnd processing section 104 and an output from another mobile station baseband processing section 113 and provides the digital/analogue conversion to the resultant to output to transmission RF section 107. Transmission RF section 107 provides to an input from multiplier 106 the waveform shaping, the frequency conversion to a carrier frequency, and the amplifying processing to output to switch 108. On the other hand, in the transmission operation, switch 108 connects transmission RF section 107 with antenna 109, and an output from transmission RF section 107 is inputted to antenna 109 to transmit to a mobile station apparatus.

The operation in receiving a signal is as follows. In the reception operation, switch 108 connects reception RF section 110 with antenna 109, and received signals from all mobile stations are received from antenna 109, and inputted to reception RF section 110. Reception RF section 110 provides to the received signals the waveform shaping, the frequency conversion to a baseband signal, and the digital/analogue conversion to output to baseband processing section 103 for each mobile station. The received signal inputted to basebaand processing section 103 is in reception baseband processing section 105 processed to detect the correlation with the same code as the spreading code used in mobile station apparatus 121, demodulated and decoded to obtain reception data 111. Control section 112 controls, in the case where the path communication qualities in a reverse link and a forward link differ, to change a frame configuration, code rate of error correction code and an spreading factor for spectrum spreading, which will be described later.

Mobile station apparatus repeats the transmission operation and the reception operation periodically in the same way as base station apparatus 101. Mobile station apparatus 121 is in the reception operation when base station apparatus 101 is in the transmission operation, while mobile station apparatus is in the transmission operation when base station apparatus is in the reception operation. The reception operation in mobile station apparatus 121 is described below. Switch 123 connects reception RF section 124 and antenna 122. Reception RF section 124 performs to an antenna received signal from a base station the waveform shaping, the frequency conversion to a baseband frequency, and the digital/analogue conversion. Reception baseband processing section 125 performs to an inputted received signal the correlation detection with the same code as the spreading code used in base station apparatus 101, separates the des red wave signal to the mobile station apparatus from a base station apparatus 101 multiplied signal, further performs to the signal synchronization processing, demodulation and decoding to obtain reception data 128. Reception level measuring circuit 126 measures the reception level of the desired wave signal component in the received signal multiplied in base station apparatus 101, and inputs the measured result to control section 127. Control section 127 monitors whether or not the frame configuration, code rate or spreading factor of the received signal from base station apparatus 101 is changed, and controls to provide the appropriate processing when obtained any change. On the other hand, the reception operation in mobile station apparatus 121 is described below. Transmission data to base station apparatus 129 is inputted to transmission baseband processing section 130. Transmission baseband processing section 130 performs to transmission data 129 the coding, modulation, spreading with a spreading code and digital/analogue conversion to output to transmission RF section 131. Transmission RF section 131 performs to the inputted signal the waveform shaping, frequency conversion to carrier frequency and amplifying processing to input to switch 123. Switch connects transmission RF section 131 and antenna 122, and an output from transmission RF section 131 is transmitted from antenna 122 to base station apparatus 101.

First Embodiment

Figure 3:
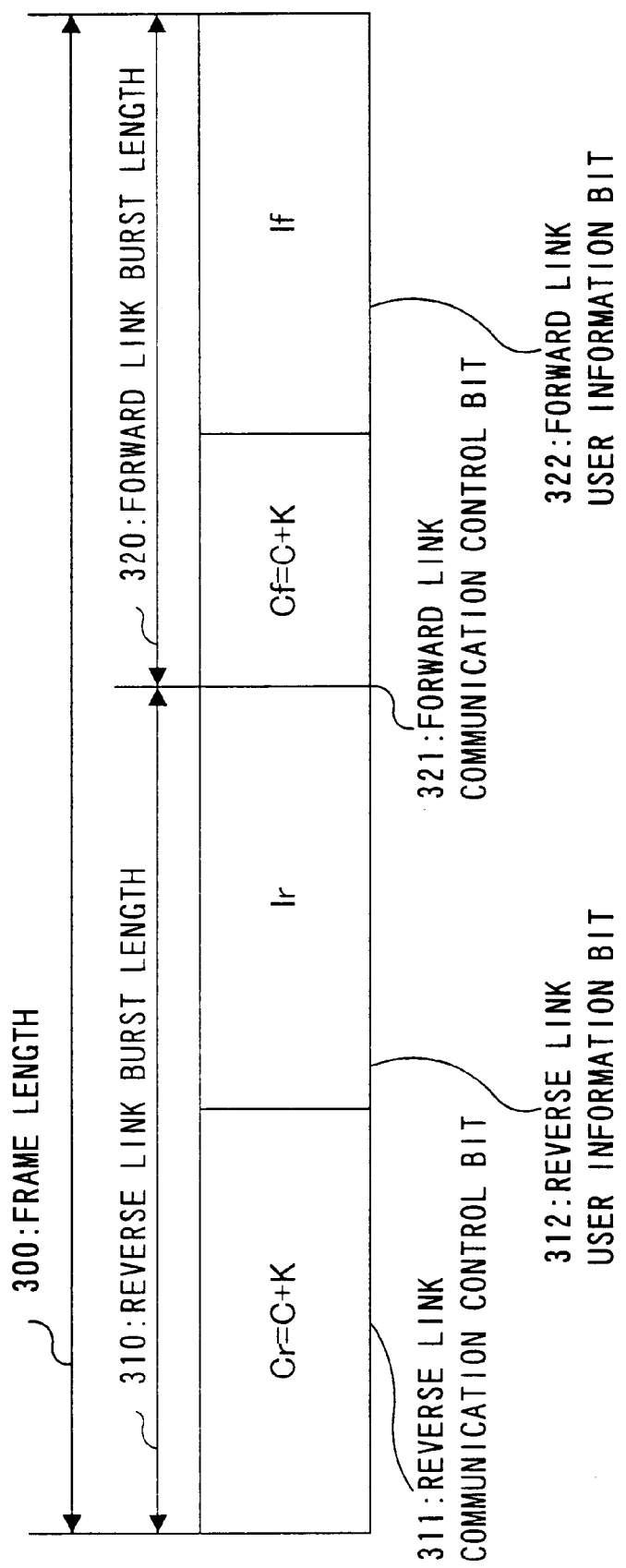
FIG. 3 is a frame construction diagram in a digital mobile communication system in the first, fourth, fifth, sixth and seventh embodiments of the present invention.

FIG. 3 illustrates an exemplary frame configuration in a digital mobile communication apparatus using a CDMA system and a TDD system in the first embodiment of the present invention. In FIG. 3, a frame is composed of a reverse link burst and a forward link burst. Frame length 300 is a sum of reverse link burst length 310 and forward link burst length 320. The reverse link burst is composed of reverse link communication control bits 311 and reverse link user information bits 312. The forward link burst is composed of forward link communication control bits 321 and forward link user information bits 322. When the bits number of reverse link communication control bits 311 is referred to Cr and the bits number of forward link communication control bits 321 is referred to Cf, Cr is larger than Cf. When the bits number of reverse link user information bits 312 is referred to Ir and the bits number of forward link user information control bits 322 is referred to If, Ir is equal to if. Accordingly, reverse link burst length 310, which is a sum of reverse link communication control bits 311 and reverse link user information bits 312, is longer than forward link burst length 320, which is a sum of forward link communication control bits 321 and forward link user information bits 322.

An explanation is given to an operation in a digital mobile communication apparatus using a CDMA system and a TDD system configured as described above. Herein it is assumed that the path communication quality of a reverse link is lower than that of a forward link. Communication control bits are composed of guard time bits inserted to prevent reverse link and forward link from the collision caused by a propagation delay, unique word bits to acquire and hold the frame synchronization, training bits and pilot bits to control adapting the elimination of the propagation path interference and adapting the equalization, bits to control the transmission power and the switching of a channel. The more the bits number of training bits and pilot bits to control the adapting are increased, the more the capability of the elimination of the propagation path interference and the equalization are increased. That allows improving of the communication quality of user information.

Accordingly, if the bits number of reverse link communication control bits 311; Cr is larger than the bits number of forward link communication control bits f321; Cf, it is possible to make in reverse link communication control bits 311 the bits number of training bits to control the adapting and control bits for the transmission power more than those in forward link communication control bits 321. That allows increasing of the accuracy to control the interference elimination, equalization, transmission power and so on in the reverse link. According to the manner, in the case where the path communication quality of a reverse link is lower than that of a forward link, it is possible to make the path communication qualities of user information in the reverse link and forward link equal.

In a TDMA (Time Division Multiple Access) system, since the channel capacity is determined by the number of time slots in the time division, such improvement of communication quality of user information results in only the improvement of communication quality of user information to assure. On the contrary, in a CDMA system, the improvement of communication quality of user information on the same channel at the same time results in the increase of number of same time channels in the case where the path communication qualities of user information to assure are set at the same. That is, the channel capacity can be increased.

The mobile station apparatus and base station apparatus in a digital mobile communication system described above are achieved in the same configuration as that in a conventional mobile station apparatus and base station apparatus in a digital mobile communication system except the frame configuration.

As described above, according to the first embodiment of the present invention, by setting the frame configuration in which reverse link burst length 310 is longer than forward link burst length 320, even in the case where the path communication quality of the reverse link is lower than that of the forward link, it is possible to make the path communication qualities of user information in the reverse link and the forward link almost equal by improving the communication quality of user information of the reverse link. That allows increasing of the system capacity.

In addition, although the above explanation is given to the configuration where reverse link burst length 310 is longer than forward link burst 320 in all frames, it is preferable to practice the configuration where reverse link burst length 310 is longer than forward link burst length 320 in some frames, while reverse link burst length 310 is equal to forward link burst length 320 in the other frames.

In the above explanation, it is assumed that the communication traffics of a reverse link and forward link are equal, so that the explanation is given to the configuration where the bits number of reverse link user information bits 312 is equal to that of forward link user information bits 322. However it is preferable to practice the configuration where the bits number of reverse link user information bits 312 is more than that of forward link user information bits 322, or the bits number of reverse link user information bits 312 is less than that of forward link user information bits 322. It is further preferable to practice the case where the above configuration is prepared only in some frames.

The above explanation is given to the configuration where reverse link communication control bits 311 is prepared before reverse link user information bits 312, and both are completely separated. However, it is preferable to practice the configuration where reverse link communication control bits 311 are prepared after reverse link user information bits 312, or the configuration where reverse link communication control bits 311 and reverse link user information bits 312 are separated into some portions, and each of them is prepared alternately in the reverse link burst. The above configurations are applicable to forward link communication bits 321 and forward link user information bits 322. It is also preferable to practice the case where the above configurations are prepared only in some frames.

The above explanation is given to the case where the path communication quality of a reverse link is lower than that of a forward link. When the path communication quality of a forward link is lower than that of a reverse link, the following frame configuration is applicable to practice, which is explained below.

Figure 4:
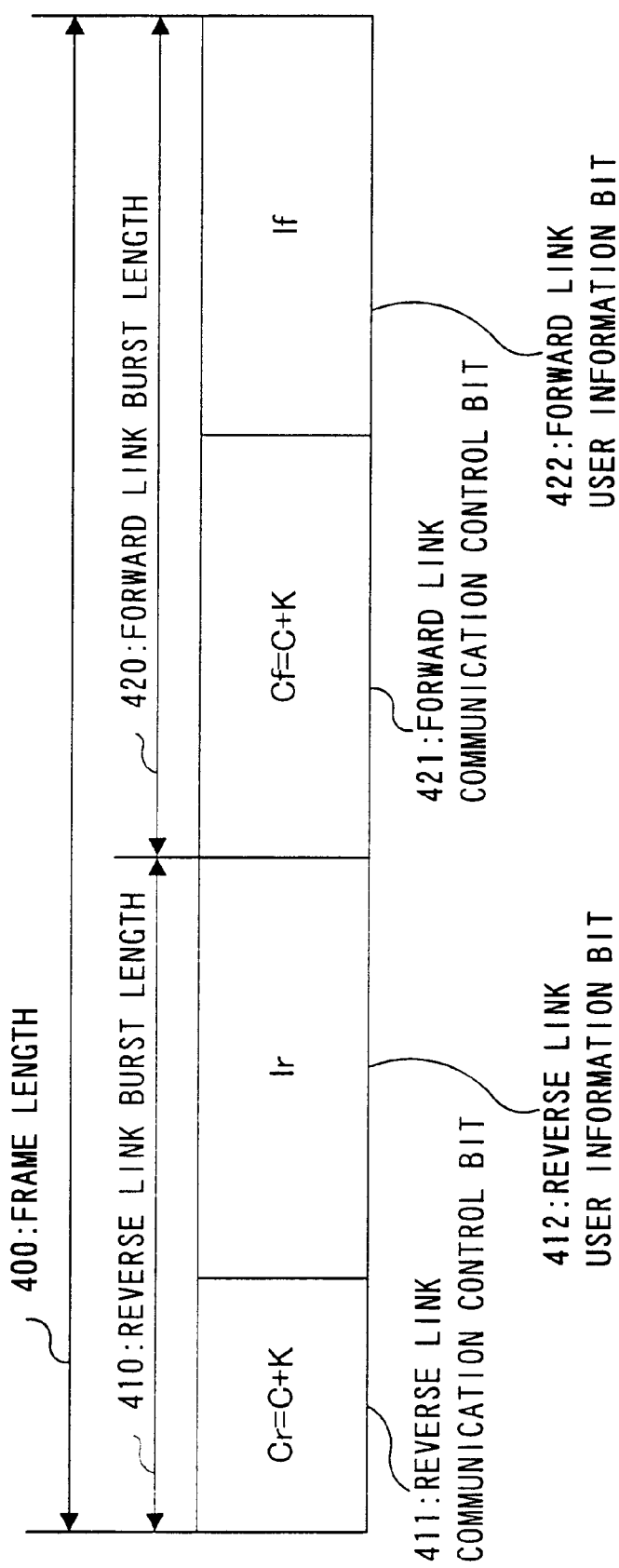
FIG. 4 is a frame construction diagram in a digital mobile communication system in the first, fourth, fifth, sixth and seventh embodiments of the present invention.

FIG. 4 illustrates a frame configuration in the case where the path communication quality of a forward link is lower than that of a reverse link in the first embodiment of the present invention. In FIG. 4, a frame is composed of a reverse link burst and a forward link burst. Frame length 400 is a sum of reverse link burst length 410 and forward link burst length 420. The reverse link burst is composed of reverse link communication control bits 411 and reverse link user information bits 412. The forward link burst is composed of forward link communication control bits 421 and forward link user information bits 422. When the bits number of reverse link communication control bits 411 is referred to Cr and the bits number of forward link communication control bits 421 is referred to Cf, Cf is larger than Cr. When the bits number of reverse link user information bits 412 is referred to Ir and the bits number of forward link user information control bits 422 is referred to If, Ir is equal to If. Accordingly, forward link burst length 420, which is a sum of forward link communication control bits 421 and forward link user information bits 422, is longer than reverse link burst length 410, which is a sum of reverse link communication control bits 411 and reverse link user information bits 412.

Thus, by setting the frame configuration in which forward link burst length 420 is longer than reverse link burst length 410, even in the case where the path communication quality of the forward link is lower than that of the reverse link, it is possible to make the path communication qualities of user information in the reverse link and the forward link almost equal by improving the communication quality of user information of the forward link. That allows increasing of the system capacity.

In addition, although the above explanation is given to the configuration where reverse link burst length 410 is shorter than forward link burst length 420 in all frames, it is preferable to practice the configuration where reverse link burst length 410 is shorter than forward link burst length 420 in some frames, while reverse link burst length 410 is equal to forward link burst length 420 in the other frames.

In the above explanation, it is assumed that the communication traffics of a reverse link and forward link are equal, so that the explanation is given to the configuration where the bits number of reverse link user information bits 412 is equal to that of forward link user information bits 422. However it is preferable to practice the configuration where the bits number of reverse link user information bits 412 is more than that of forward link user information bits 422, or the bits number of reverse link user information bits 412 is less than that of forward link user information bits 422. It is further preferable to practice the case where the above configuration is prepared only in some frames.

The above explanation is given to the configuration where reverse link communication control bits 411 is prepared before reverse link user information bits 412, and both are completely separated. However, it is preferable to practice the configuration where reverse link communication control bits 411 are prepared after reverse link user information bits 412, or the configuration where reverse link communication control bits 411 and reverse link user information bits 412 are separated into some portions, and each of them is prepared alternately in the reverse link burst. The above configurations are applicable to forward link communication bits 321 and forward link user information bits 422. It is also preferable to practice the case where the above configurations are prepared only in some frames.

Second Embodiment

Figure 5:
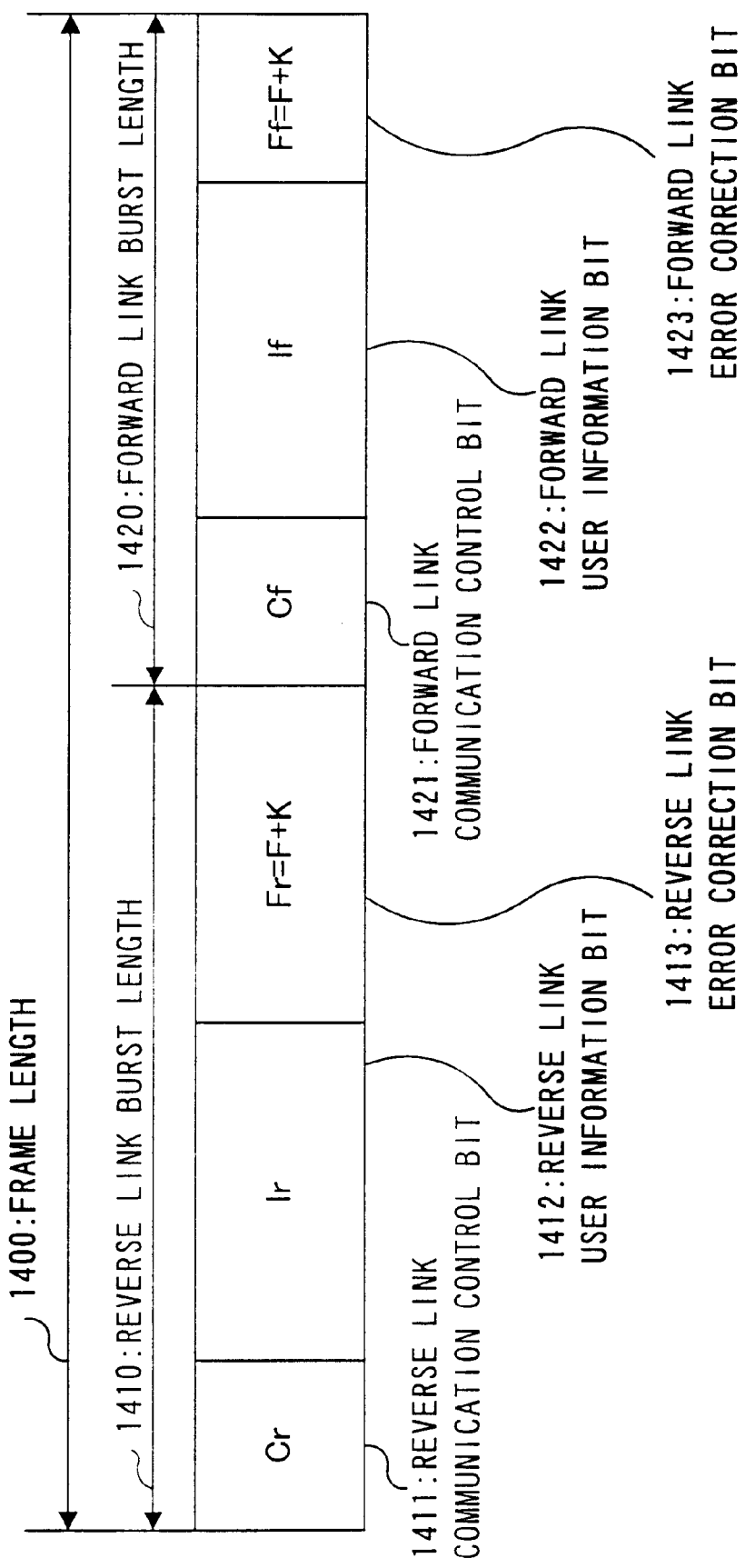
FIG. 5 is a frame construction diagram in a digital mobile communication system in the second and eighth embodiments of the present invention.

FIG. 5 illustrates an exemplary frame configuration in a digital mobile communication apparatus using a TDD system and a CDMA system in the first embodiment of the present invention, and the case where the path communication quality of a reverse link is lower than that of a forward link. In FIG. 5, a frame is composed of a reverse link burst and a forward link burst. Frame length 1400 is a sum of reverse link burst length 1410 and forward link burst length 1420. The reverse link burst is composed of reverse link communication control bits 1411, reverse link user information bits 1412 and reverse link error correction bits 1413. The forward link burst is composed of forward link communication control bits 1421, forward link user information bits 1422 and forward link error correction bits 1423. When the bits number of reverse link communication control bits 1411 is referred to Cr and the bits number of forward link communication control bits 1421 is referred to Cf, Cr and Cf are equal. When the bits number of reverse link user information bits 1412 is referred to Ir and the bits number of forward link user information control bits 1422 is referred to If, Ir and If are equal. When the bits number of reverse link error correction bits 1413 is referred to Fr and the bits number of forward link error correction bits 1423 is referred to Ff, Fr is larger than Ff. Accordingly, reverse link burst length 1410, which is a sum of reverse link communication control bits 1411, reverse link user information bits 1412 and reverse link error correction bits 1413, is longer than forward link burst length 1420, which is a sum of forward link communication control bits 1421, forward link user information bits 1422, and forward link error correction bits 1423.

An explanation is given to an operation in a digital mobile communication apparatus using a CDMA system and a TDD system configured as described above. Communication control bits are composed of guard time bits inserted to prevent reverse link and forward link from the collision caused by a propagation delay, unique word bits to acquire and hold the frame synchronization, training bits and pilot bits to control adapting the elimination of the propagation path interference and adapting the equalization, bits to control the transmission power and the switching of a channel. User information bits are, for instance, coded voice signal in a phone. Error correction bits are the information in a reception side to correct the error that may occur in communication control bits and user information bits on a propagation path, and generated in a transmission side based on the communication control bits and user information bits. The error correction capability depends on the ratio of the original bits number and the error correction coded bits number (error correction code rate). The more the bits number of error correction bits is increased (the lower error correction code rate goes), the more the capability of the error correction is increased.

Accordingly, if the bits number of reverse link error correction bits 1412; Fr is larger than the bits number of forward link error correction bits 1423; Ff, it is possible to increase the control accuracy of transmission power or the like in reverse link communication control bits 1411 more than that in forward link communication control bits 1421. And it is also possible to increase in the user information bits the error correction capability of the reverse link more than that of the forward link. According to the manner, in the case where the path communication quality of a reverse link is lower than that of a forward link, it is possible to make the path communication qualities of user information in the reverse link and forward link equal.

In a TDMA system, since the channel capacity is determined by the number of time slots in the time division, such improvement of communication quality of user information results in only the improvement of communication quality of user information to assure. On the contrary, in a CDMA system, the improvement of communication quality of user information on the same channel at the same time results in the increase of number of same time channels in the case where the path communication qualities of user information to assure are set at the same. That is, the channel capacity can be increased.

The mobile station apparatus and base station apparatus in a digital mobile communication system described above are achieved in the same configuration as that in a conventional mobile station apparatus and base station apparatus in a digital mobile communication system except the frame configuration.

As described above, according to the second embodiment of the present invention, by setting the frame configuration in which reverse link burst length 1410 is longer than forward link burst length 1420, which results in making the error correction coding rate of the reverse link lower than that of the forward link, even in the case where the path communication quality of the reverse link is lower than that of the forward link, it is possible to make the path communication qualities of user information in the reverse link and the forward link equal so as to improve the path communication quality of the reverse link user information. That allows increasing of the system capacity.

In addition, although the above explanation is given to the configuration where reverse link burst length 1410 is longer than forward link burst 1420 in all frames, it is preferable to practice the configuration where reverse link burst length 1410 is longer than forward link burst length 1420 in some frames, while reverse link burst length 1410 is equal to forward link burst length 1420 in the other frames.

In the above explanation, it is assumed that the communication traffics of a reverse link and forward link are equal, so that the explanation is given to the configuration where the bits number of reverse link user information bits 1412 is equal to that of forward link user information bits 1422. However it is preferable to practice the configuration where the bits number of reverse link user information bits 1412 is more than that of forward link user information bits 1422, or the bits number of reverse link user information bits 1412 is less than that of forward link user information bits 1422. It is also preferable to apply those configurations to the bits number of reverse link communication control bits 1411 and the bits number of forward link communication control bits 1421. It is further preferable to practice the case where the above configuration is prepared only in some frames.

The above explanation is given to the configuration where reverse link communication control bits 1411 is prepared before reverse link user information bits 1412, and both are completely separated. However, it is preferable to practice the configuration where reverse link communication control bits 1411 is prepared after reverse link user information bits 1412, or the configuration where reverse link communication control bits 1411 and reverse link user information bits 1412 are separated into some portions, and each of them is prepared alternately in the reverse link burst. The above configurations are applicable to forward link communication bits 1421 and forward link user information bits 1422. It is also preferable to practice the case where the above configurations are prepared only in some frames.

The above explanation is given to the case where the path communication quality of a reverse link is lower than that of a forward link. When the path communication quality of a forward link is lower than that of a reverse link, the following frame configuration is applicable to practice, which is explained below.

Figure 6:
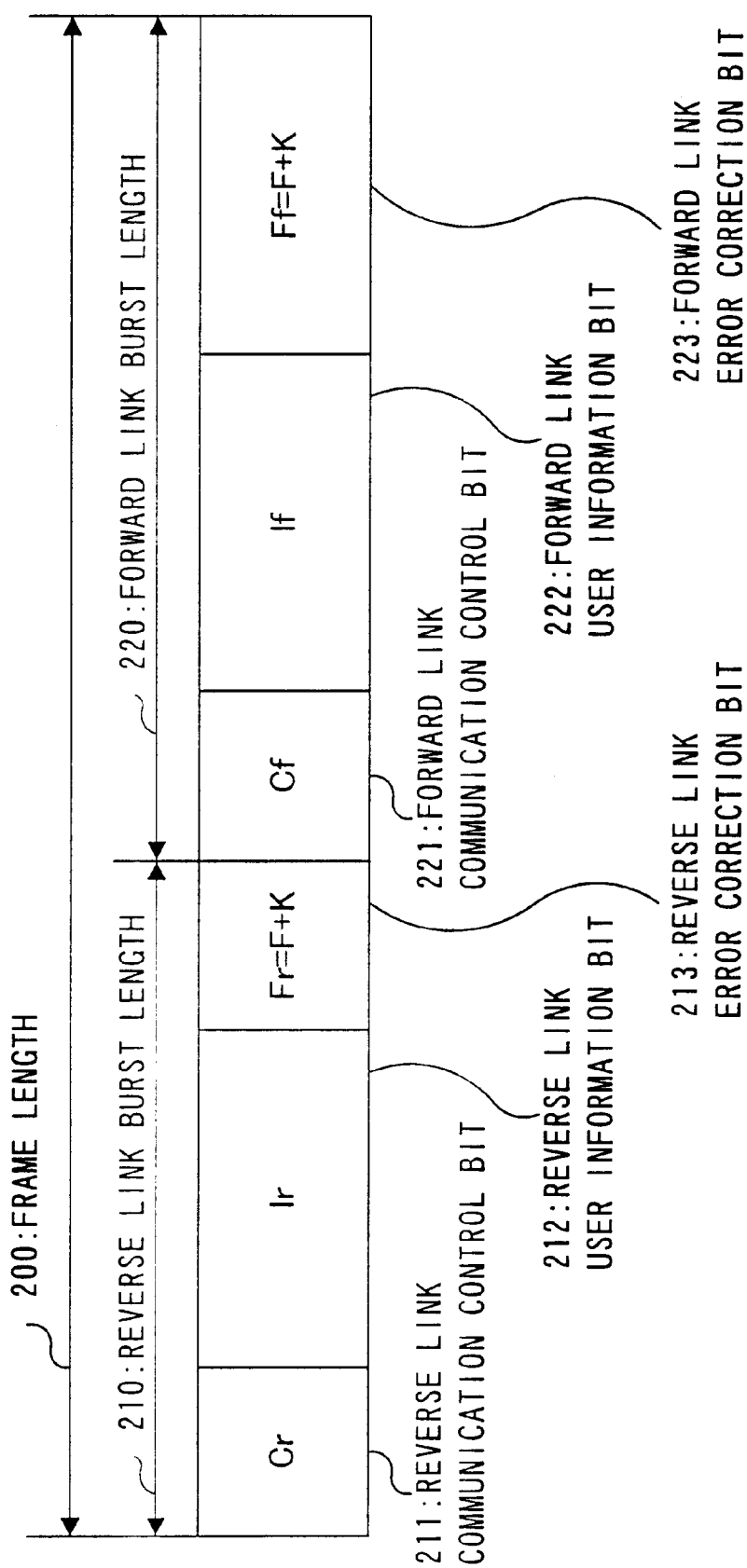
FIG. 6 is a frame construction diagram in a digital mobile communication system in the second and eighth embodiments of the present invention.

FIG. 6 illustrates a frame configuration in the case where the path communication quality of a forward link is lower than that of a reverse link. In FIG. 6, a frame is composed of a reverse link burst and a forward link burst. Frame length 200 is a sum of reverse link burst length 210 and forward link burst length 220. The reverse link burst is composed of reverse link communication control bits 211, reverse link user information bits 212 and reverse link error correction bits 213. The forward link burst is composed of forward link communication control bits 221, forward link user information bits 222 and forward link error correction bits 223. When the bits number of reverse link communication control bits 211 is referred to Cr and the bits number of forward link communication control bits 221 is referred to Cf, Cf and Cr and are equal. When the bits number of reverse link user information bits 212 is referred to Ir and the bits number of forward link user information control bits 222 is referred to If, Ir and If are equal. When the bits number of reverse link error correction bits 213 is referred to Fr and the bits number of forward link error correction bits 223 is referred to Ff, Ff is larger than Fr. Accordingly, forward link burst length 220, which is a sum of forward link communication control bits 211, forward link user information bits 222 and forward link error correction bits 223, is longer than reverse link burst length 210, which is a sum of reverse link communication control bits 221, reverse link user information bits 212, and reverse link error correction bits 213.

An explanation is given to an operation in a digital mobile communication apparatus using a CDMA system and a TDD system configured as described above. Communication control bits are composed of guard time bits inserted to prevent reverse link and forward link from the collision caused by a propagation delay, unique word bits to acquire and hold the frame synchronization, training bits and pilot bits to control adapting the elimination of the propagation path interference and adapting the equalization, bits to control the transmission power and the switching of a channel. User information bits are, for instance, coded voice signal in a phone. Error correction bits are the information in a reception side to correct the error that may occur in communication control bits and user information bits on a propagation path, and generated in a transmission side based on the communication control bits and user information bits. The error correction capability depends on the ratio of the original bits number and the error correction coded bits number (error correction code rate). The more the bits number of error correction bits is increased (the lower error correction code rate goes), the more the capability of the error correction is increased.

Accordingly, if the bits number of forward link error correction bits 223; Ff is larger than the bits number of reverse link error correction bits 1423; Fr, it is possible to increase the control accuracy of transmission power or the like in forward link communication control bits 221 more than that in reverse link communication control bits 211. And it is also possible to make in the user information bits the error correction capability of the forward link more than that of the reverse link. According to the manner, in the case where the path communication quality of a forward link is lower than that of a reverse link, it is possible to make the path communication qualities of user information in the reverse link and forward link equal.

In a TDMA (Time Division Multiple Access) system, since the channel capacity is determined by the number of time slots in the time division, such improvement of communication quality of user information results in only the improvement of communication quality of user information to assure. On the contrary, in a CDMA system, the improvement of communication quality of user information on the same channel at the same time results in the increase of number of same time channels in the case where the path communication qualities of user information to assure are set at the same. That is, the channel capacity can be increased.

The mobile station apparatus and base station apparatus in a digital mobile communication system described above are achieved in the same configuration as that in a conventional mobile station apparatus and base station apparatus in a digital mobile communication system except the frame configuration.

As described above, according to the second embodiment of the present invention, by setting the frame configuration in which forward link burst length 220 is longer than reverse link burst length 210, which results in making the error correction coding rate of the forward link lower than that of the reverse link, even in the case where the path communication quality of the reverse link is lower than that of the forward link, it is possible to make the path communication qualities of user information in the reverse link and the forward link equal. That allows increasing of the channel capacity communicable at the same.

In addition, although the above explanation is given to the configuration where forward link burst length 120 is longer than reverse link burst 110 in all frames, it is preferable to practice the configuration where forward link burst length 120 is longer than reverse link burst length 110 in some frames, while reverse link burst length 110 is equal to forward link burst length 120 in the other frames.

In the above explanation, it is assumed that the communication traffics of a reverse link and forward link are equal, so that the explanation is given to the configuration where the bits number of reverse link user information bits 22 is equal to that of forward link user information bits 222. However it is preferable to practice the configuration where the bits number of forward link user information bits 222 is more than that of reverse link user information bits 222, or the bits number of forward link user information bits 222 is less than that of reverse link user information bits 212. Those configurations are also applicable to the bits number of reverse link communication control bits 211 and the bits number of forward link communication control bits 221. It is further preferable to practice the case where the above configuration is prepared only in some frames.

The above explanation is given to the configuration where reverse link communication control bits 211 is prepared before reverse link user information bits 212, and both are completely separated. However, it is preferable to practice the configuration where reverse link communication control bits 211 is prepared after reverse link user information bits 212, or the configuration where reverse link communication control bits 211 and reverse link user information bits 212 are separated into some portions, and each of them is prepared alternately in the reverse link burst. The above configurations are applicable to forward link communication bits 221 and forward link user information bits 222. It is also preferable to practice the case where the above configurations are prepared only in some frames.

Third Embodiment

Figure 7:
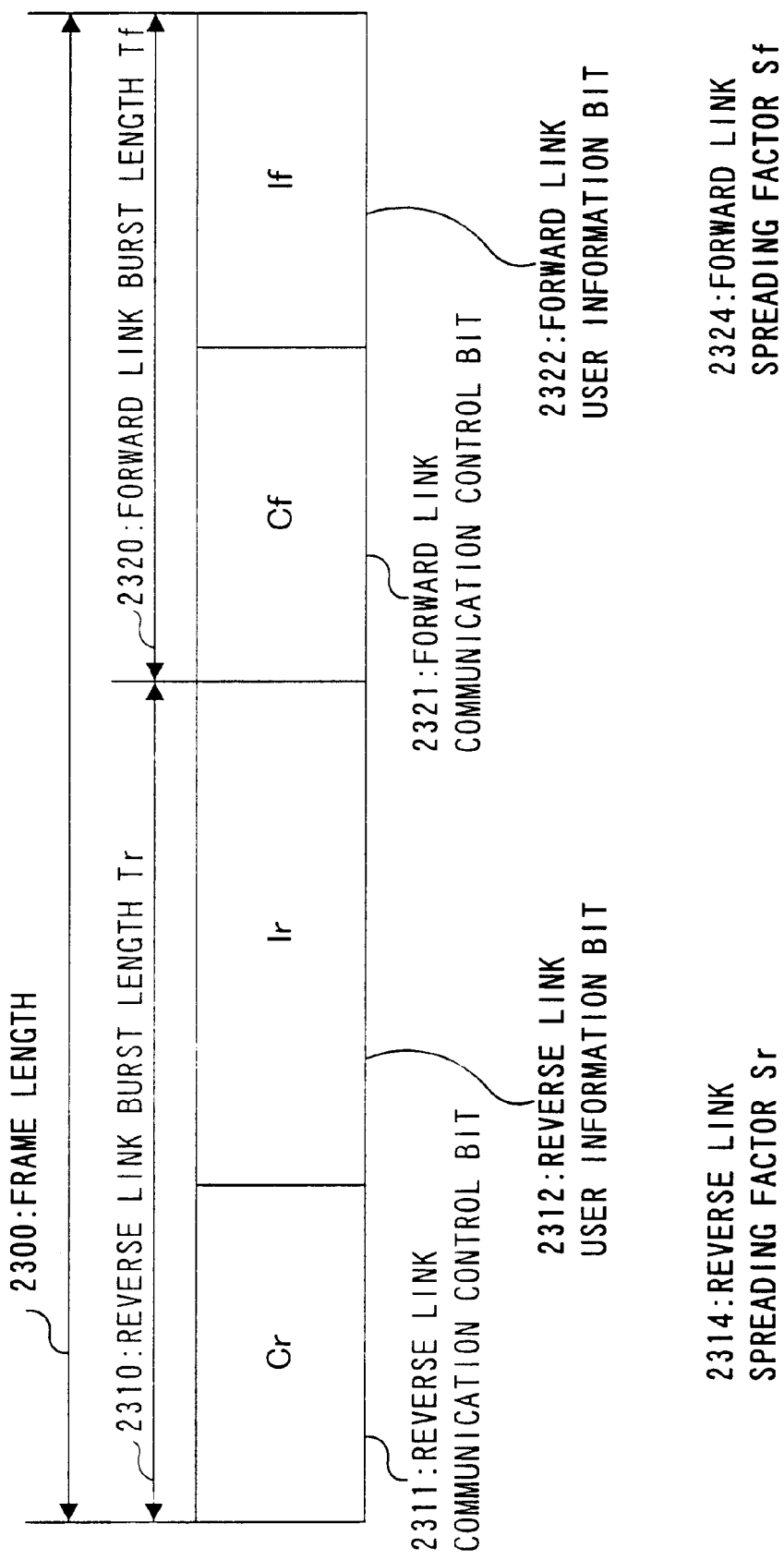
FIG. 7 is a frame construction diagram in a digital mobile communication system in the third and ninth embodiments of the present invention.

FIG. 7 illustrates an exemplary frame configuration in a digital mobile communication apparatus using a CDMA system and a TDD system in the third embodiment of the present invention. In FIG. 63, a frame is composed of a reverse link burst and a forward link burst. Frame length 2300 is a sum of reverse link burst length 2310 and forward link burst length 2320. Reverse link burst length is referred to Tr, and forward link burst length is referred to Tf. The reverse link burst is composed of reverse link communication control bits 2311 and reverse link user information bits 2312. The forward link burst is composed of forward link communication control bits 2321 and forward link user information bits 2322. The bits number of reverse link communication control bits 2311 and forward link communication control bits 2321 is referred to C, the bits number of reverse link user information bits 2312 and forward link user information control bits 2322 is referred to I. Reverse link spreading factor 2314 is referred to Sr, and forward link spreading factor 2324 is referred to Sf, and it is assumed that Sr is larger than Sf. Since the bits number of communication control bits in the reverse link and those in the forward link are equal, reverse link burst length 2310 is longer than forward link burst length 2320 when reverse link spreading factor Sr 2314 is larger than forward link spreading factor Sf 2324. Herein, a spreading factor is a ratio of a symbol rate before the spreading (for instance, one bit/symbol in BPSK modulation, and two bits/symbol in QPSK modulation) to a chip rate after the spreading. When the numbers of symbols before the spreading are the same, after the spreading, the number of chips in the symbol with high spreading factor is larger than that with low spreading factor.

An explanation is given to an operation in a digital mobile communication apparatus using a CDMA system and a TDD system configured as described above. In a CDMA system, an information signal is multiplied with a spreading code. The spreading code length is the spreading factor. The frequency band is spread to transmit, a reception side obtains the despreading process gain corresponding to the spreading factor. Accordingly, the larger spreading factor allows a communication to have the higher resistance to propagation path noise. Communication control bits are composed of guard time bits inserted to prevent reverse link and forward link from the collision caused by a propagation delay, unique word bits to acquire and hold the frame synchronization, training bits and pilot bits to control adapting the elimination of the propagation path interference and adapting the equalization, bits to control the transmission power and the switching of a channel. The larger the spreading factor and the process gain are increased, the more the training of adaptive control accuracy is increased, which results in the increase of the functions of the elimination of the propagation path interference and the equalization. And the higher resistance to propagation path brings the higher control accuracy of transmission power or the like, which results in the high resistance to propagation path interference.

Accordingly, when reverse link spreading factor 2314 is larger than forward link spreading factor 2324, the resistance to propagation path noise of the reverse link can be higher than that of the forward link. And the accuracy of transmission power and so on are also increased. Because of it, in the case where the path communication quality of a reverse link is lower than that of a forward link, it is possible to make the path communication qualities of the reverse link and forward link equal. In a TDMA system, since the channel capacity is determined by the number of time slots in the time division, such improvement of communication quality of user information results in only the improvement of communication quality of user information to assure. On the contrary, in a CDMA system, the improvement of communication quality of user information on the same channel at the same time results in the increase of number of same time channels in the case where the path communication qualities of user information to assure are set at the same. That is, the channel capacity can be increased.

And, when in a reverse link and forward link, the spreading factor is only different, and the bit configuration in a frame is the same, a digital modulating section for spreading and a digital demodulating section for despreading are different, while the configuration of the other circuits are common.

The mobile station apparatus and base station apparatus in a digital mobile communication system described above are achieved in the same configuration as that in a conventional mobile station apparatus and base station apparatus in a digital mobile communication system except the frame configuration.

As described above, according to the third embodiment of the present invention, by setting that the frame configuration in which reverse link burst length 2310 is longer than forward link burst length 2320, and reverse link spreading factor 2314 is larger than forward link spreading factor 2324, even in the case where the path communication quality of the reverse link is lower than that of the forward link, it is possible to make the path communication qualities of user information in the reverse link and the forward link equal. That allows increasing of the number of channel communicable at the same time.

In addition, although the above explanation is given to the configuration where reverse link burst length 2310 is longer than forward link burst 2320 in all frames, it is preferable to practice the configuration where reverse link burst length 2310 is longer than forward link burst length 2320 in some frames, while reverse link burst length 2310 is equal to forward link burst length 2320 in the other frames. It is the same concerning the spreading factor.

In the above explanation, it is assumed that the communication traffics of a reverse link and forward link are equal, so that the explanation is given to the configuration where the bits number of reverse link user information bits 2312 is equal to that of forward link user information bits 2322. However it is preferable to practice the configuration where the bits number of reverse link user information bits 2312 is more than that of forward link user information bits 2322, or the bits number of reverse link user information bits 2312 is less than that of forward link user information bits 2322. It is further preferable to practice the case where the above configuration is prepared only in some frames.

The above explanation is given to the configuration where reverse link communication control bits 2311 is prepared before reverse link user information bits 2312, and both are completely separated. However, it is preferable to practice the configuration where reverse link communication control bits 2311 is prepared after reverse link user information bits 2312, or the configuration where reverse link communication control bits 2311 and reverse link user information bits 2312 are separated into some portions, and each of them is prepared alternately in the reverse link burst. The above configurations are applicable to forward link communication bits 2321 and forward link user information bits 2322. It is also preferable to practice the case where the above configurations are prepared only in some frames.

The above explanation is given to the case where the path communication quality of a reverse link is lower than that of a forward link. When the path communication quality of a forward link is lower than that of a reverse link, the following frame configuration is applicable to practice, which is explained below.

Figure 8:
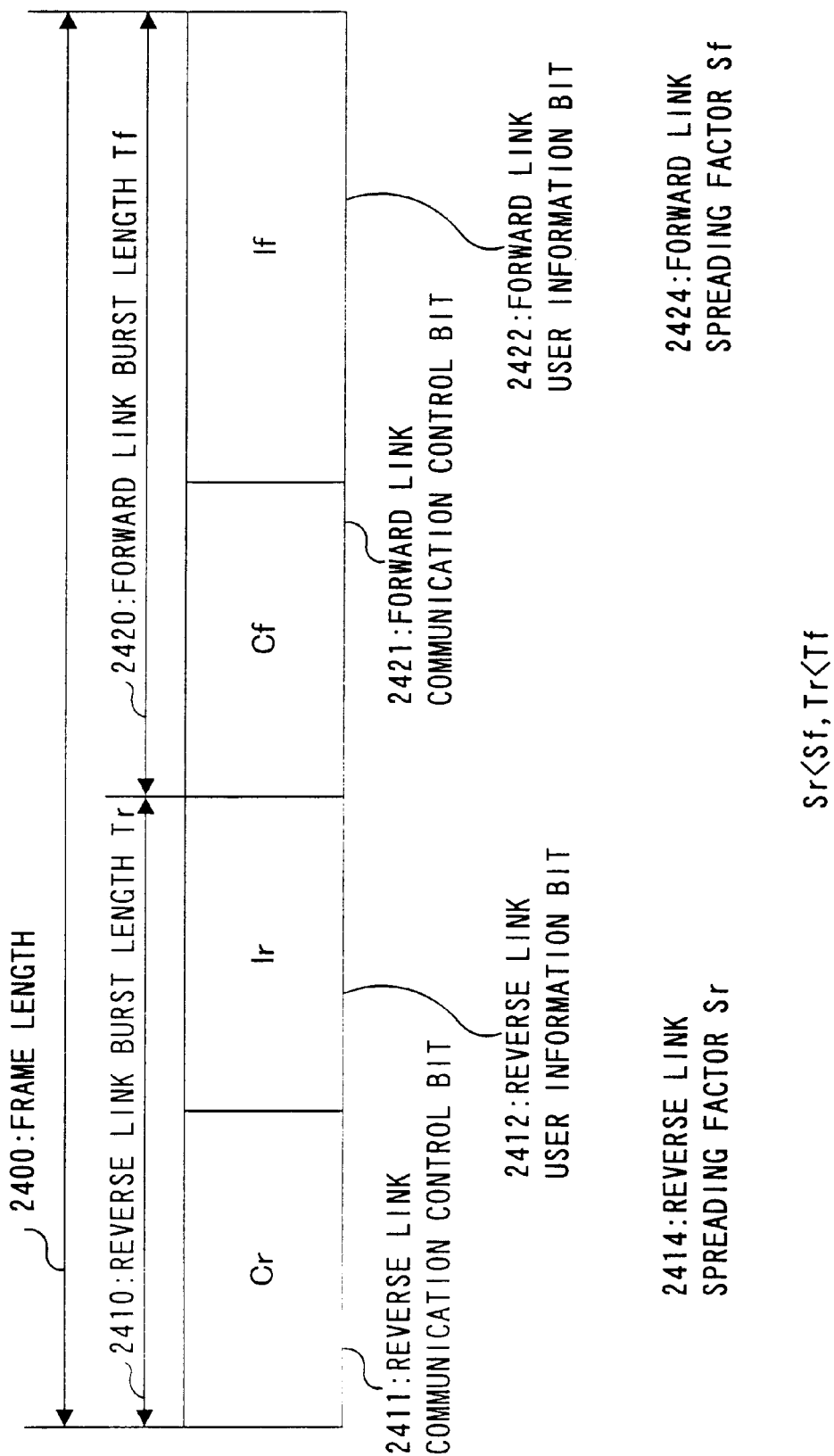
FIG. 8 is a frame construction diagram in a digital mobile communication system in the third and ninth embodiments of the present invention.

FIG. 8 illustrates an exemplary frame configuration in the case where the path communication quality of a forward link is lower than that of a reverse link. In FIG. 8, a frame is composed of a reverse link burst and a forward link burst. Frame length 2400 is a sum of reverse link burst length 2410 and forward link burst length 2420. Reverse link burst length is referred to Tr, and forward link burst length is referred to Tf. The reverse link burst is composed of reverse link communication control bits 2411 and reverse link user information bits 2412. The forward link burst is composed of forward link communication control bits 2421 and forward link user information bits 2422. The bits number of reverse link communication control bits 2411 and forward link communication control bits 2421 is referred to C, the bits number of reverse link user information bits 2412 and forward link user information control bits 2422 is referred to I. Reverse link spreading factor 2414 is referred to Sr, and forward link spreading factor 2324 is referred to Sf, and it is assumed that Sf is larger than Sr. Since the bits number of communication control bits in the reverse link and those in the forward link are equal, forward link burst length 2420 is longer than reverse link burst length 2420 when forward link spreading factor Sf 2424 is larger than reverse link spreading factor Sr 2414.

An explanation is given to an operation in a digital mobile communication apparatus using a CDMA system and a TDD system configured as described above. In a CDMA system, an information signal is multiplied with a spreading code. The spreading code length is the spreading factor. The frequency band is spread to transmit, and a reception side obtains the despreading process gain corresponding to the spreading factor. Accordingly, the larger spreading factor allows a communication having the higher resistance to propagation path noise. Communication control bits are composed of guard time bits inserted to prevent reverse link and forward link from the collision caused by a propagation delay, unique word bits to acquire and hold the frame synchronization, training bits and pilot bits to control adapting the elimination of the propagation path interference and adapting the equalization, bits to control the transmission power and the switching of a channel. The larger the spreading factor and the process gain are increased, the more the training of adaptive control accuracy is increased, which results in the increase of the functions of the elimination of the propagation path interference and the equalization. And the higher resistance to propagation path brings the higher control accuracy of transmission power or the like, which results in the high resistance to propagation path interference.

Accordingly, when forward link spreading factor 2424 is larger than reverse link spreading factor 2414, the resistance to propagation path noise of the forward link can be higher than that of the reverse link. And the accuracy of transmission power and so on are also increased. Because of it, in the case where the path communication quality of a forward link is lower than that of a reverse link, it is possible to make the path communication qualities of the reverse link and forward link equal.

In a TDMA system, since the channel capacity is determined by the number of time slots in the time division, such improvement of communication quality of user information results in only the improvement of communication quality of user information to assure. On the contrary, in a CDMA system, the improvement of communication quality of user information on the same channel at the same time results in the increase of number of same time channels in the case where the path communication qualities of user information to assure are set at the same. That is, the channel capacity can be increased.

And, when in a reverse link and forward link, the spreading factor is only different, and the bit configuration in a frame is the same, a digital modulating section for spreading and a digital demodulating section for despreading are different, while the configuration of the other circuits are common.

The mobile station apparatus and base station apparatus in a digital mobile communication system described above are achieved in the same configuration as that in a conventional mobile station apparatus and base station apparatus in a digital mobile communication system except the frame configuration.

As described above, according to the third embodiment of the present invention, by setting that the frame configuration in which forward link burst length 2420 is longer than reverse link burst length 2410, and reverse link spreading factor 2424 is larger than reverse link spreading factor 2414, even in the case where the path communication quality of the forward link is lower than that of the reverse link, it is possible to make the path communication qualities of user information in the reverse link and the forward link equal. That allows increasing the number of channel communicable at the same time.

In addition, although the above explanation is given to the configuration where forward link burst length 2420 is longer than reverse link burst 2410 in all frames, it is preferable to practice the configuration where forward link burst length 2420 is longer than reverse link burst length 2410 in some frames, while reverse link burst length 2410 is equal to forward link burst length 2420 in the other frames. It is the same concerning the spreading factor.

In the above explanation, it is assumed that the communication traffics of a reverse link and forward link are equal, so that the explanation is given to the configuration where the bits number of reverse link user information bits 2412 is equal to that of forward link user information bits 2422. However it is preferable to practice the configuration where the bits number of reverse link user information bits 2412 is more than that of forward link user information bits 2422, or the bits number of reverse link user information bits 2412 is less than that of forward link user information bits 2422. It is further preferable to practice the case where the above configuration is prepared only in some frames.

The above explanation is given to the configuration where reverse link communication control bits 2411 is prepared before reverse link user information bits 2412, and both are completely separated. However, it is preferable to practice the configuration where reverse link communication control bits 2411 is prepared after reverse link user information bits 2412, or the configuration where reverse link communication control bits 2411 and reverse link user information bits 2412 are separated into some portions, and each of them is prepared alternately in the reverse link burst. The above configurations are applicable to forward link communication bits 2421 and forward link user information bits 2422. It is also preferable to practice the case where the above configurations are prepared only in some frames.

Forth Embodiment

Figure 9:
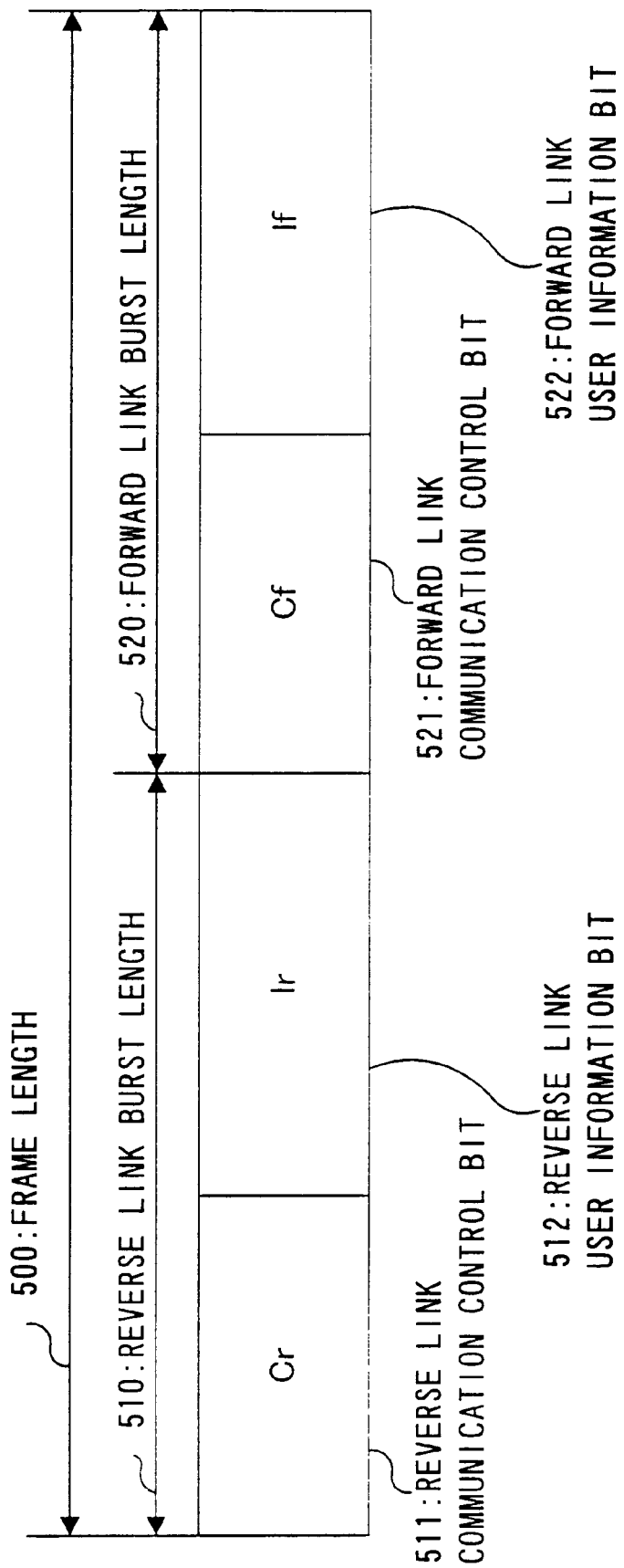
FIG. 9 is a frame construction diagram in a digital mobile communication system in the fourth, fifth, sixth and seventh embodiments of the present invention.

FIG. 9 illustrates an exemplary frame configuration in a digital mobile communication apparatus using a CDMA system and a TDD system in the fourth embodiment of the present invention. In FIG. 9, a frame is composed of a reverse link burst and a forward link burst. Frame length 500 is a sum of reverse link burst length 510 and forward link burst length 520. The reverse link burst is composed of reverse link communication control bits 511 and reverse link user information bits 512. The forward link burst is composed of forward link communication control bits 521 and forward link user information bits 522. When the bits number of reverse link communication control bits 511 is referred to Cr and the bits number of forward link communication control bits 521 is referred to Cf, Cf and Cr are equal. When the bits number of reverse link user information bits 512 is referred to Ir and the bits number of forward link user information control bits 522 is referred to If, Ir and If are equal. Accordingly, forward link burst length 520, which is a sum of forward link communication control bits 521 and forward link user information bits 522 is and reverse link burst length 510, which is a sum of reverse link communication control bits 511 and reverse link user information bits 512, are equal.

Figure 10:
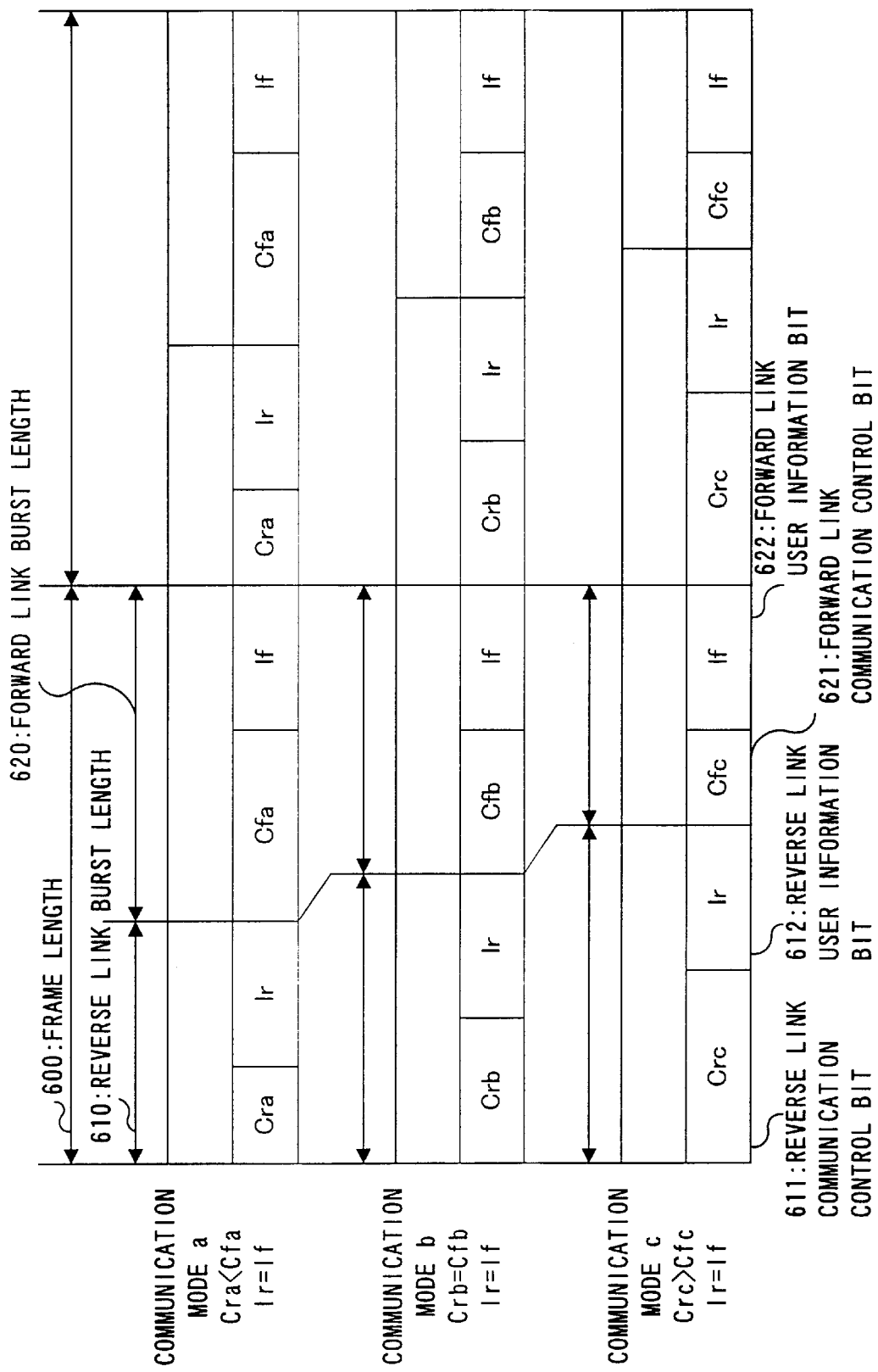
FIG. 10 is a frame construction diagram in a digital mobile communication system in the fourth, fifth, sixth and seventh embodiments of the present invention.

FIG. 10 illustrates an exemplary frame configuration in a digital mobile communication system comprising the above frame configuration and two frame configuration described in the first embodiment. In communication mode a, the bits number of forward link communication control bits Cfa is larger than that of reverse link communication control bits Cra, and the bits number of reverse link user information bits Ir and that of forward link user information bits If are equal. Accordingly, the forward link burst length is longer than the reverse link burst length. In communication mode b, the bits number of reverse link communication control bits Crb and that of reverse link communication control bits Cfb are equal, and the bits number of reverse link user information bits Ir and that of forward link user information bits If are also equal. Accordingly, the forward link burst length and the reverse link burst length are equal. In communication mode c, the bits number of reverse link communication control bits Crc is larger than that of forward link communication control bits Cfc, and the bits number of reverse link user information bits Ir and that of forward link user information bits If are equal. Accordingly, the reverse link burst length is longer than the forward link burst length.

And in a communication between a certain mobile station and a base station, in the case where the path communication quality of a reverse link is lower than that of a forward link, a channel using communication mode c is assigned to the mobile station. On the contrary, in the case where the path communication quality of a forward link is lower than that of a reverse link, a channel using communication mode a is assigned to the mobile station. And in the case where the path communication quality of a reverse link and that of forward link are almost equal, a channel using communication mode b is assigned to the mobile station.

Figure 11:
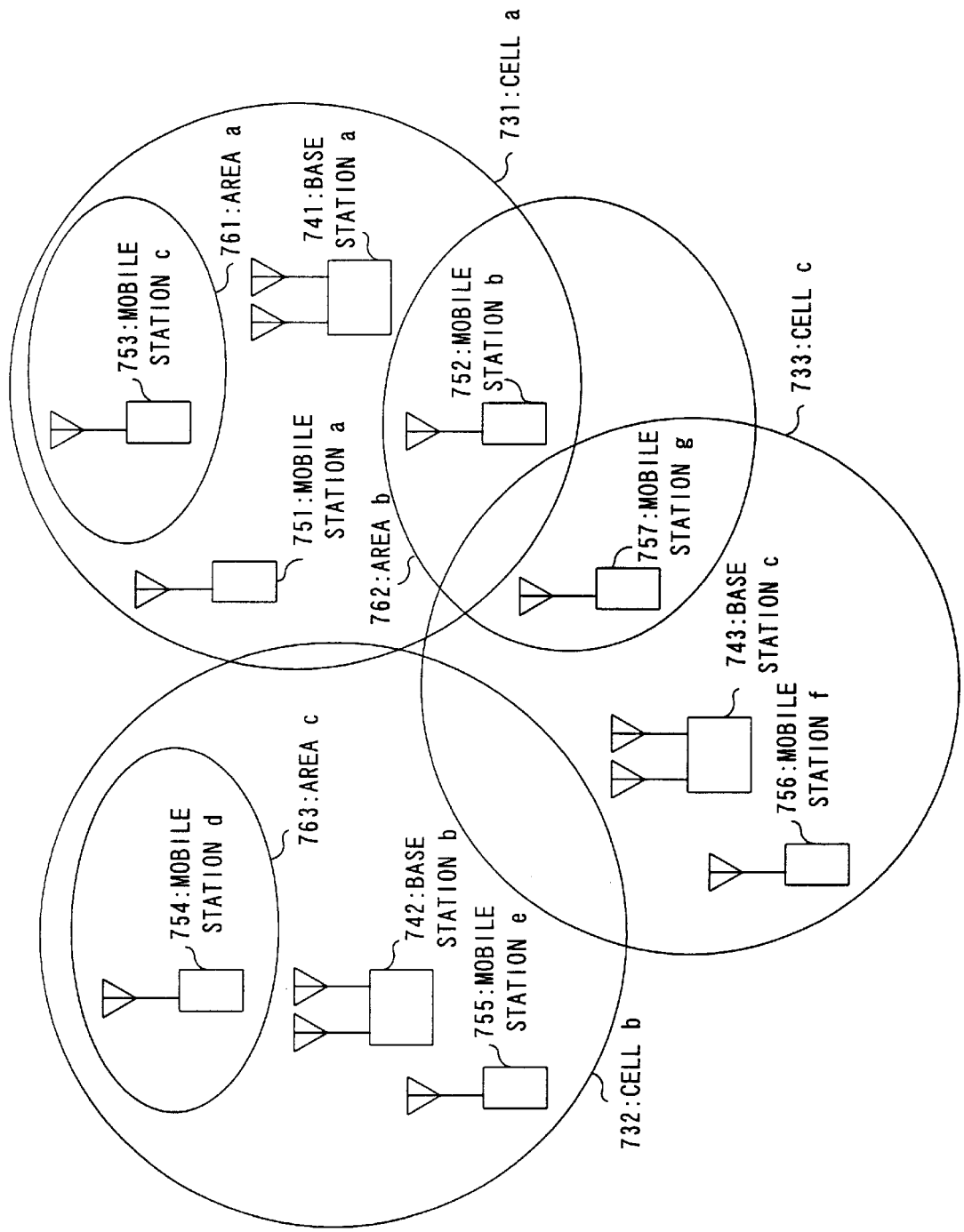
FIG. 11 is a concept diagram of digital mobile communication system in the fourth, fifth, sixth, seventh, eighth and ninth embodiments of the present invention.

FIG. 11 is used to explain an operation in a mobile communication system configured as described above. FIG. 11 is a concept diagram of a cellular mobile communication system. In FIG. 11, a system is composed three cells of cell a 731 under the control of base station a 741, cell b 732 under the control of base station b 742 and cell c 733 under the control of base station c 743. Mobile station a 751, mobile station b 752 and mobile station c 753 are located in cell a 731. Mobile station d 754 and mobile station e 755 are located in cell b 732. Mobile station f 756 and mobile station g 757 are located in cell c 733. In area a 761, the path communication quality of the forward link is lower than that of the reverse link. In area b 742 and area c 763, the path communication quality of the reverse link is lower than that of the forward link. In other areas, the path communication qualities of the reverse link and forward link are almost equal.

Cell a 731 includes area a 761 and area b 762. Base station a 741 uses, from among a plurality of carrier frequencies under the control, some for communication mode a, the others for communication mode b and the rest for communication mode c. When mobile station c 753 in area a 761 requires a connection, the base station assigns a channel of the carrier frequency with communication mode a. When mobile station b 752 in area b 762 requires a connection, the base station assigns a channel of the carrier frequency with communication mode c. When mobile station a 751 not in either of area a 761 or area b 762 requires a connection, the base station assigns a channel of the carrier frequency with communication mode b. From which area a connection is required is estimated by examining the path communication qualities of the reverse link and forward link using a control channel. In the case where mobile station c 753 transits out of area a 761, the base station detects the transition, and switches the channel of the carrier frequency with communication mode a to the channel of the carrier frequency with communication mode b, if possible. Further in the case where mobile station c 753 transits out of area b 762, the base station detects the transition, and switches the channel of the carrier frequency with communication mode b to the channel of the carrier frequency with communication mode c, if possible. The above manner is the same as the other mobile stations.

Cell b 732 includes area c 763. Base station b 742 uses, from among a plurality of carrier frequencies under the control, some for communication mode b and the rest for communication mode c. When mobile station d 754 in area c 763 requires a connection, the base station assigns the channel of the carrier frequency with communication mode c. When mobile station e 755 not in area c 763 requires a connection, the base station assigns the channel of the carrier frequency with communication mode b. From which area a connection is required is estimated by examining the path communication qualities of the reverse link and forward link using a control channel. In the case where mobile station e 755 transits out of area c 763, the base station detects the transition, and switches the channel of the carrier frequency with communication mode b to the channel of the carrier frequency with communication mode c, if possible. The above manner is the same as the other mobile stations.

Cell c 733 includes area b 762. Base station c 743 uses, from among a plurality of carrier frequencies under the control, some for communication mode b and the rest for communication mode c. The assignment of a channel to a mobile station is the same as the above-mentioned manner.

In the case where the path communication quality of a forward link is lower than that of a reverse link, a channel of the carrier frequency with a communication mode a is assigned. In the case where the path communication quality of a reverse link is lower than that of a forward link, a channel of the carrier frequency with a communication mode c is assigned. In the case where the path communication qualities of a reverse link and forward link are almost equal, a channel of the carrier frequency with communication mode b is assigned. In those cases, by the effect described in the first embodiment, it is possible to make the path communication qualities of user information of a reverse link and forward link equal. And it is preferable to make the path communication qualities of user information of a reverse link and forward link equal, by improving the path communication quality of the communication link with lower communication quality of user information in a reverse link and forward link, however which might result in the decrease of the path communication quality of the communication link with higher communication quality of user information. Because, in a CDMA system, that increases the number of channels communicable at the same time, and the communication capacity of channel.

As described above, according to the fourth embodiment of the present invention, it is possible to make the path communication qualities of user information of a reverse link and forward link equal in the case where the path communication qualities of a reverse link and forward link are not equal, by comprising the communication mode in which a reverse link burst length is longer than a forward link burst length, the communication mode in which a forward link burst length is longer than a reverse link burst length and the communication mode in which a reverse link burst length and forward link burst length are equal.

Figure 12:
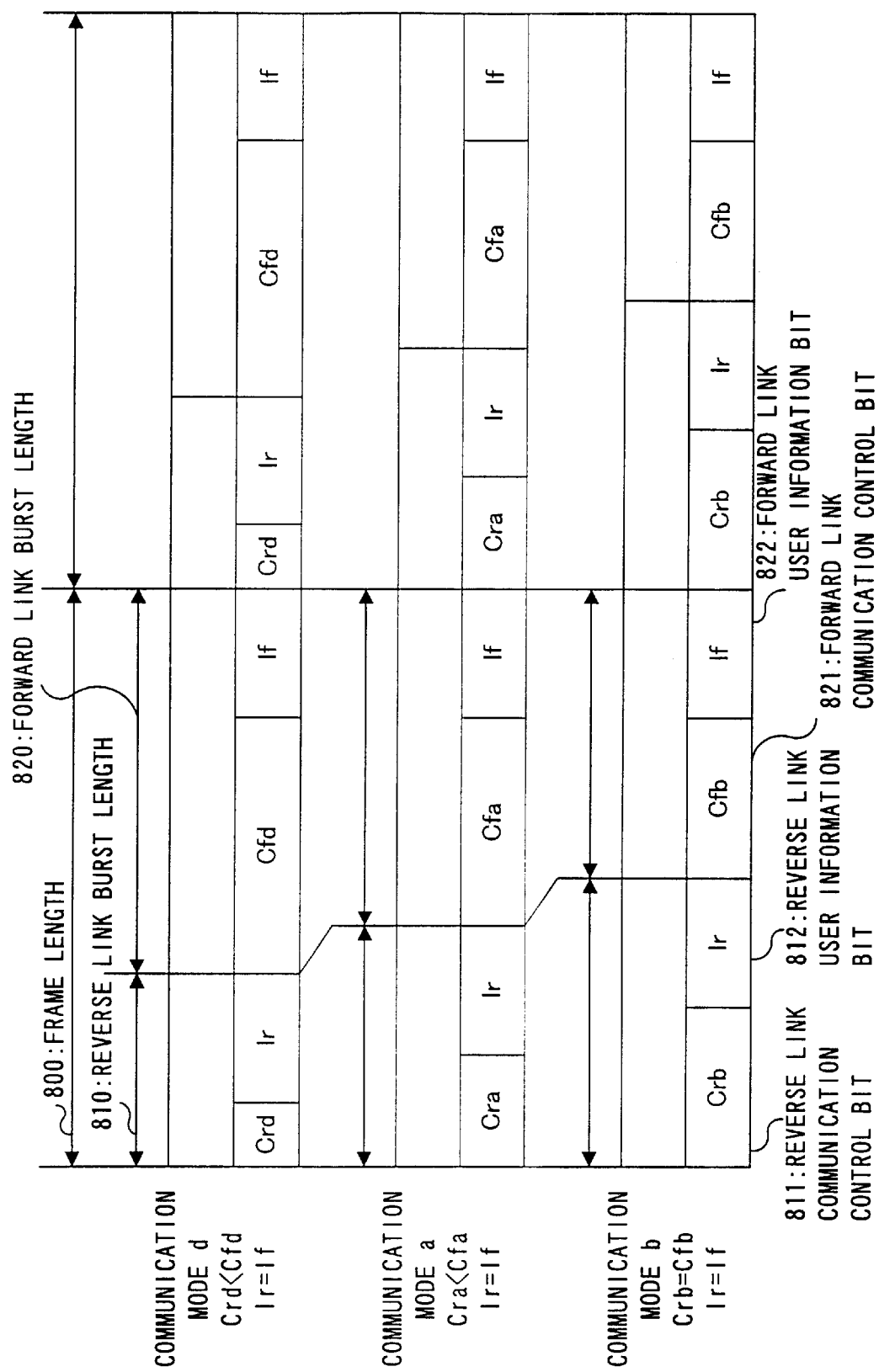
FIG. 12 is a frame construction diagram in a digital mobile communication system in the fourth, fifth, sixth and seventh embodiments of the present invention.
Figure 13:
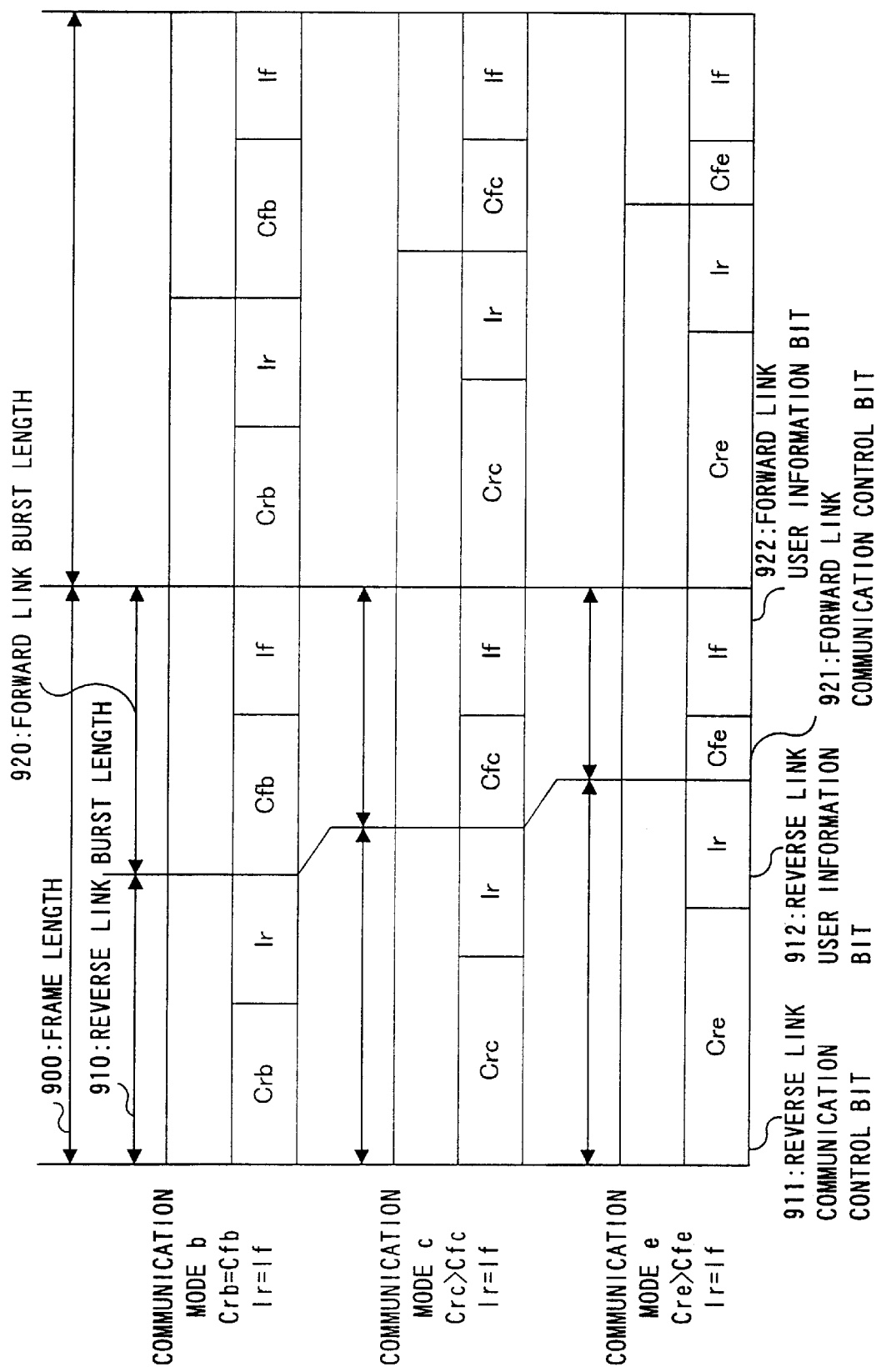
FIG. 13 is a frame construction diagram in a digital mobile communication system in the fourth, fifth, sixth and seventh embodiments of the present invention.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

Although the above explanation is given to the case where the assignment of a carrier frequency is fixed, it is preferable that a base station comprises a section to detect the demand of each communication mode, and corrects the assignment automatically at a certain interval.

And the above explanation is given the configuration where the relation of a reverse link burst length and a forward link in all frames is in the case as illustrated in FIG. 3, FIG. 4 or FIG. 5. However it is preferable to practice the configuration where such configuration is only in some frames while a reverse link burst length and a forward link burst length are equal in the other frames.

In the above explanation, it is assumed that the communication traffics of a reverse link and forward link are equal, so that the explanation is given to the configuration where the bits number of reverse link user information bits is equal to that of forward link user information bits. However it is preferable to practice the configuration where the bits number of reverse link user information bits is more than that of forward link user information bits, or the bits number of reverse link user information bits is less than that of forward link user information bits. It is further preferable to practice the case where the above configuration is prepared only in some frames.

The above explanation is given to the configuration where reverse link communication control bits are prepared before reverse link user information bits, and both are completely separated. However, it is preferable to practice the configuration where reverse link communication control bits are prepared after reverse link user information bits, or the configuration where reverse link communication control bits and reverse link user information bits are separated into some portions, and each of them is prepared alternately in the reverse link burst. The above configurations are applicable to forward link communication bits and forward link user Information bits. It is also preferable to practice the case where the above configurations are prepared only in some frames.

Figure 14:
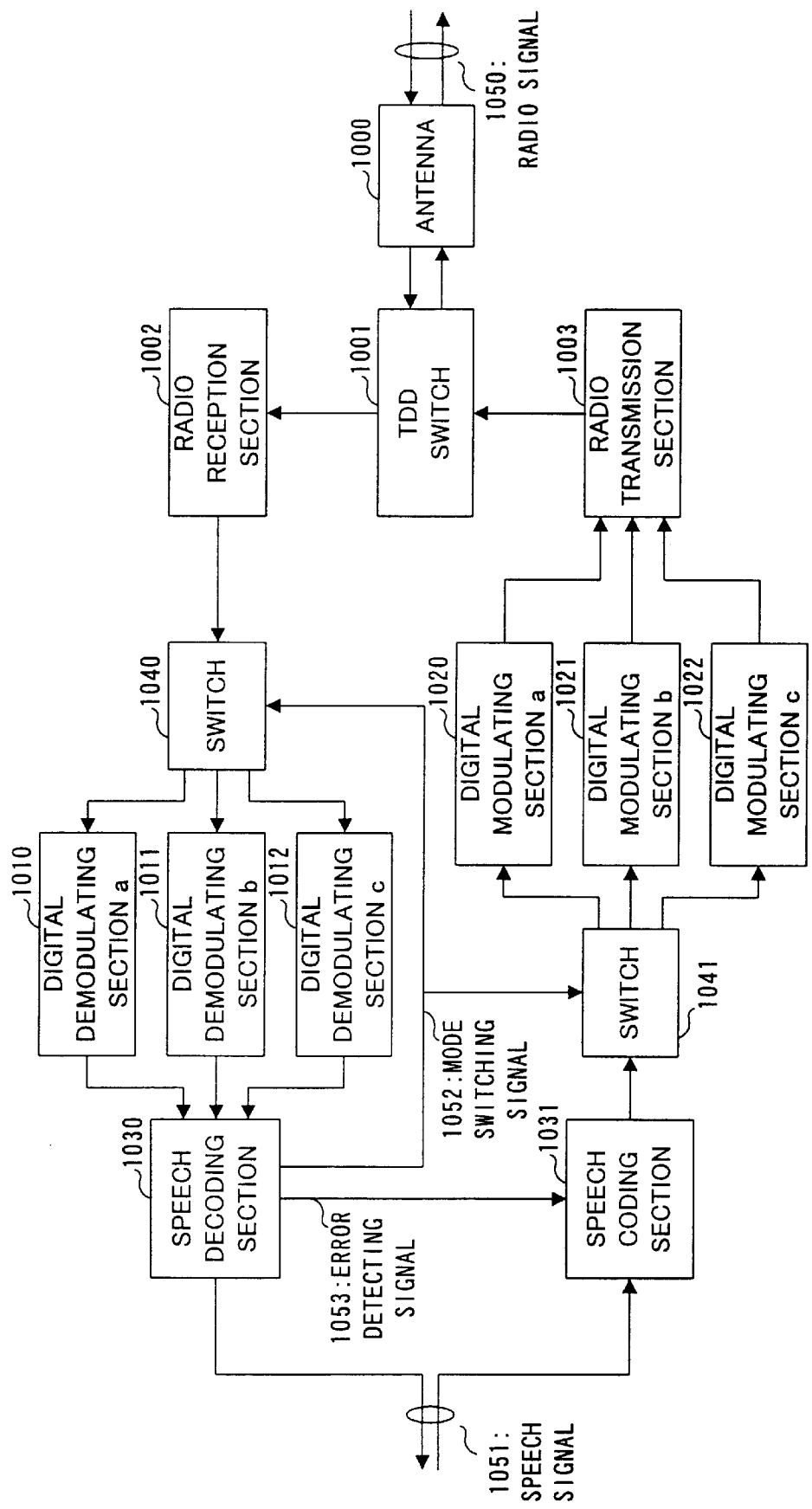
FIG. 14 is a diagram illustrating a configuration of a mobile station apparatus in a digital mobile communication system in the fourth and ninth embodiments of the present invention.

FIG. 14 illustrates an exemplary configuration of a mobile station apparatus in a digital mobile communication system using a CDMA system and a TDMA system in the forth embodiment of the present invention. The apparatus performs a communication of a voice signal, comprising three communication modes each having a different ratio of a reverse link burst length and a forward link burst length. In FIG. 14, 1000 is an antenna to transmit and receive radio signal 1050, and 1001 is a time division duplex switch to switch radio reception section 1002 and radio transmission section 1003 in time division. Radio reception section 1002 is switched by switch 1040, and connected to any of digital demodulating section a 1010, digital demodulating section b 1011 or digital demodulating section c 1012. 1030 is a voice decoding section and 1031 is a voice coding section. The voice coded signal is switched by switch 1041, and connected to any of digital modulating section a 1020, digital modulating section b 1021 or digital modulating section c 1022. 1051 is a voice signal. 1052 is a mode switching signal to instruct which communication mode is used. 1053 is an error detecting signal to estimate the path communication quality of a communication link.

An explanation is given to an operation of a mobile station apparatus in a digital mobile communication system using a CDMA system and a TDMA system configured as described above. Radio signal 1050 transmitted from a base station in a forward link is received in antenna 1000 and inputted to radio reception section 1002 via time division duplex switch 1001. The signal down-converted to a baseband frequency in radio reception section 1002 is demodulated in a digital demodulating section. A digital demodulating section is different depending on the communication mode, and is switched to any of digital demodulating section a 1010, digital demodulating section b 1011 and digital demodulating section ac 1012 by mode switching signal 1052. The connection is provided to digital demodulating section a 1010 in the case of using communication mode a, digital demodulating section b 1011 in the case of using communication mode b, and digital demodulating section c 1012 in the case of using communication mode c. Communication mode a is communication mode a illustrated in FIG. 6 in which a forward link burst length is longer than a reverse link burst length. Communication mode b is communication mode b illustrated in FIG. 6 in which a forward link burst length and a reverse link burst length are equal. Communication mode c is communication mode a illustrated in FIG. 6 in which a reverse link burst length is longer than forward link burst length. The digital demodulated signal is inputted to voice decoding section 1030. Voice decoding section 1030 reproduces voice signal 1051 in the forward link from forward link user information bits, while monitoring forward link communication control bits, performing the instruction of mode switching signal 1052 and the error detection to transmit error detecting signal 1053 to voice coding section 1031. Voice signal 1051 for a reverse link is voice coded in voice coding section 1031 to be reverse link user information bits, which are switched by switch 1041 with reverse link communication control bits including error detecting signal to transmit to a digital modulating section. Switch 1041 performs the switching according to mode switching signal 1052 to digital modulating section a 1020 in communication mode a, digital modulating section b 1021 in communication mode b and digital modulating section c 1022 in communication mode c. The digital modulated signal is up converted to a carrier frequency in radio transmission section 1003 and transmitted to a base station apparatus from antenna 1000 via time division duplex switch 1001.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the fourth embodiment of the present invention, since a mobile station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given to the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Fifth Embodiment

Figure 15:
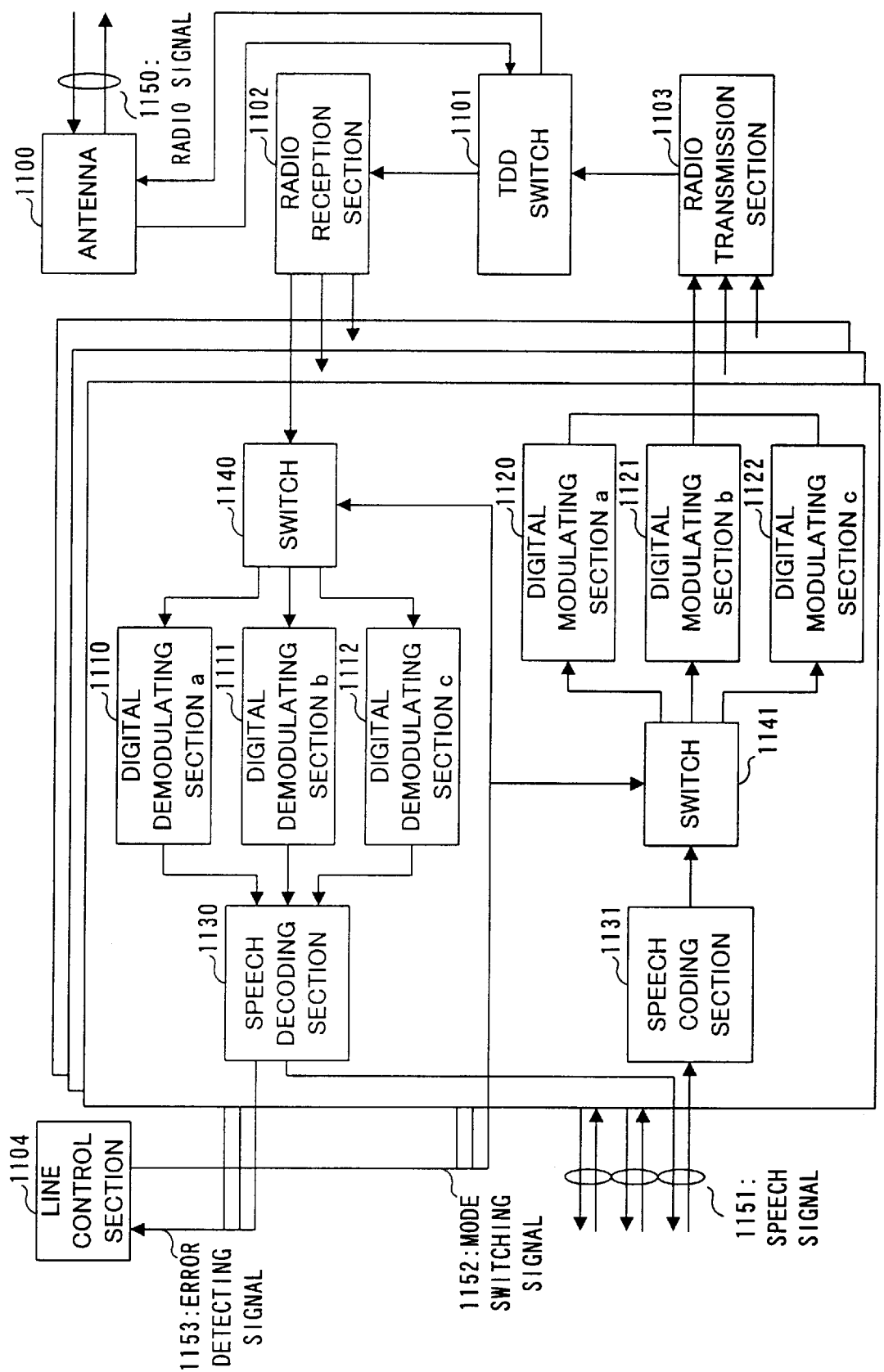
FIG. 15 is a diagram illustrating a configuration of a base station apparatus in a digital mobile communication system in the fifth and ninth embodiments of the present invention.

FIG. 15 illustrates an exemplary configuration of a base station apparatus in a digital mobile communication system using a CDMA system and a TDMA system in the fifth embodiment of the present invention. The apparatus performs a communication of a voice signal, comprising three communication modes each having a different ratio of a reverse link burst length and a forward link burst length. In FIG. 15, 1100 is an antenna to transmit and receive radio signal 1150, and 1101 is a time division duplex switch to switch radio reception section 1102 and radio transmission section 1103 in time division. Radio reception section 1102 distributes a signal to transmit to a block of each channel. In the block of each channel, the switching is performed by switch 1140 to connect to any of digital demodulating section a 1110, digital demodulating section b 1111 or digital demodulating section c 1112. 1130 is a voice decoding section and 1131 is a voice coding section. The voice coded signal is switched by switch 1141, and connected to any of digital modulating section a 1120, digital modulating section b 1121 or digital modulating section c 1122. 1104 is a line control section to control the assignment of a channel and so on by monitoring an error detecting signal and so on of each channel. 1151 is a voice signal. 1152 is a mode switching signal to instruct which communication mode is used. 1153 is an error detecting signal to estimate the path communication quality of a communication link.

An explanation is given to an operation of a base station apparatus in a digital mobile communication system using a CDMA system and a TDMA system configured as described above. Radio signal 1150 transmitted from a mobile station in a reverse link is received in antenna 1100 and inputted to radio reception section 1102 via time division duplex switch 1101. The signal down-converted to a baseband frequency in radio reception section 1102 is distributed to each channel and demodulated in a digital demodulating section. A digital demodulating section is different depending on the communication mode, and is switched to any of digital demodulating section a 1110, digital demodulating section b 1111 and digital demodulating section c 1112 by mode switching signal 1152. The connection is provided to digital demodulating section a 1110 in the case of using communication mode a, digital demodulating section b 1111 in the case of using communication mode b, and digital demodulating section c 1112 in the case of using communication mode c. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode c illustrated in FIG. 10 in which a reverse link burst length is longer than forward link burst length. The digital demodulated signal is inputted to voice decoding section 1130. Voice decoding section 1130 reproduces voice signal 1151 in the reverse link from reverse link user information bits, while monitoring reverse link communication control bits, reading the error detecting information in a forward link, performing the error detection in a reverse link to transmit error detecting signal 1153 to line control section 1104. Line control section 1104 decides the assignment of a communication mode to each channel using the error detection information of each channel in the reverse link and forward link to instruct to a block of each channel by mode switching signal 1152. Voice signal 1151 for a forward link is voice coded in voice coding section 1131 to be forward link user information bits, which are switched by switch 1141 along with forward link communication control bits to transmit to a digital modulating section. Switch 1141 performs the switching according to mode switching signal 1152 to digital modulating section a 1120 in communication mode a, digital modulating section b 1121 in communication mode b and digital modulating section c 1122 in communication mode c. The digital modulated signal is each channel combined, up converted to a carrier frequency in radio transmission section 1103 and transmitted to a base station from antenna 1100 via time division duplex switch 1101.

Thus it is possible to use communication mode c in which a reverse link burst length is longer than a forward link burst length in the case where the path communication quality of the reverse Link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication qualities of user information bits in a reverse link and forward link almost equal even in the case where the path communication qualities in a reverse link and forward link are different. As a result, the communication capacity of a channel is increased as described in the third embodiment and others.

As described above, according to the fifth embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable Lo practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Although the above explanation is given to the case where the assignment of a carrier frequency is fixed, it is preferable that a base station comprises a section to detect the demand of each communication mode, and corrects the assignment automatically at a certain interval.

Sixth Embodiment

Figure 16:
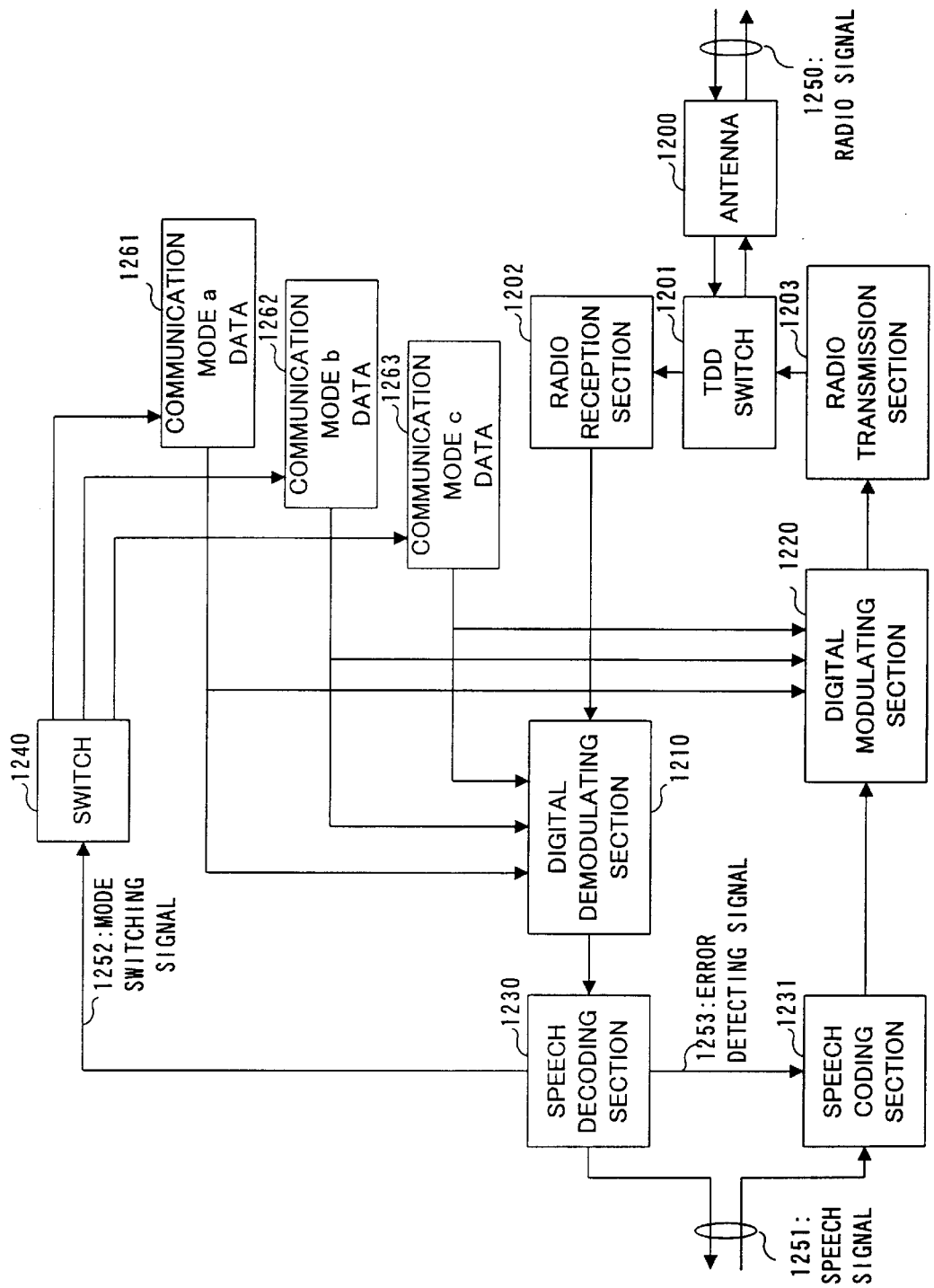
FIG. 16 is a diagram illustrating a configuration of a mobile station apparatus in a digital mobile communication system in the sixth and ninth embodiments of the present invention.

FIG. 16 illustrates an exemplary configuration of a mobile station apparatus in a digital mobile communication system using a CDMA system and a TDMA system in the sixth embodiment of the present invention. The apparatus performs a communication of a voice signal comprising three communication modes each having a different ratio of a reverse link burst length and a forward link burst length. In FIG. 16, 1200 is an antenna to transmit and receive radio signal 1250, and 1201 is a time division duplex switch to switch radio reception section 1202 and radio transmission section 1203 in time division. Radio reception section 1202 is connected to digital demodulating section 1210. Switch 1240 switches the data used in digital demodulating section 1210 to any of communication mode a data 1261, communication mode data b 1262 or communication mode data c 1263. 1230 is a voice decoding section and 1231 is a voice coding section. The voice coded signal is switched by switch 1240, and connected to digital modulating section 1220 using communication mode a data 1261, communication mode data b 1262 or communication mode data c 1263. 1251 is a voice signal. 1252 is a mode switching signal to instruct which communication mode is used. 1253 is an error detecting signal to estimate the path communication quality of a communication link.

An explanation is given to an operation of a mobile station apparatus in a digital mobile communication system using a CDMA system and a TDMA system configured as described above. Radio signal 1250 transmitted from a base station in a forward link is received in antenna 1200 and inputted to radio reception section 1202 via time division duplex switch 1201. The signal down-converted to a baseband frequency in radio reception section 1202 is demodulated in a digital demodulating section. The detailed operations of a digital demodulating section is different depending on the communication mode, and the data for the operation is switched by mode switching signal 1252. And communication mode a data 1261, communication mode b data 1262 or communication mode c data 1262 is used. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode a illustrated in FIG. 10 in which a reverse link burst length is longer than forward link burst length. In the case of using communication mode a, communication mode a data 1261 is transmitted to digital demodulating section 1210. In the case of using communication mode b, communication mode b data 1262 is transmitted to digital demodulating section 1210. In the case of using communication mode c, communication mode c data 1263 is transmitted to digital demodulating section 1210. The digital demodulated signal is transmitted to voice decoding section 1230. Voice decoding section 1230 reproduces voice signal 1251 in the forward link from forward link user information bits, while monitoring forward link communication control bits, performing the instruction of mode switching signal 1252 and the error detection to transmit error detecting signal 1253 to voice coding section 1231. Voice signal 1251 for a reverse link is voice coded in voice coding section 1231 to be reverse link user information bits, which are transmitted to a digital demodulating section with reverse link communication control bits including error detecting signal. Switch 1240 transmits according to mode switching signal 1252 communication mode data a 1261 to digital modulating section 1220 in the case of using communication mode a, communication mode data b 1262 to a digital modulating section 1220 in the case of using communication mode b and communication data c data 1263 to digital modulating section 1220 in the case of communication mode c. The digital modulated signal is up converted to a carrier frequency in radio transmission section 1203 and transmitted to a base station apparatus from antenna 1200 via time division duplex switch 1201.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the sixth embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows increasing the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 13, it is preferable to practice the configuration comprising the three modes of communication mode b n which a reverse link burst length and a forward link burst length are equal, communication mode c in which a reverse link burst length is a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Seventh Embodiment

Figure 17:
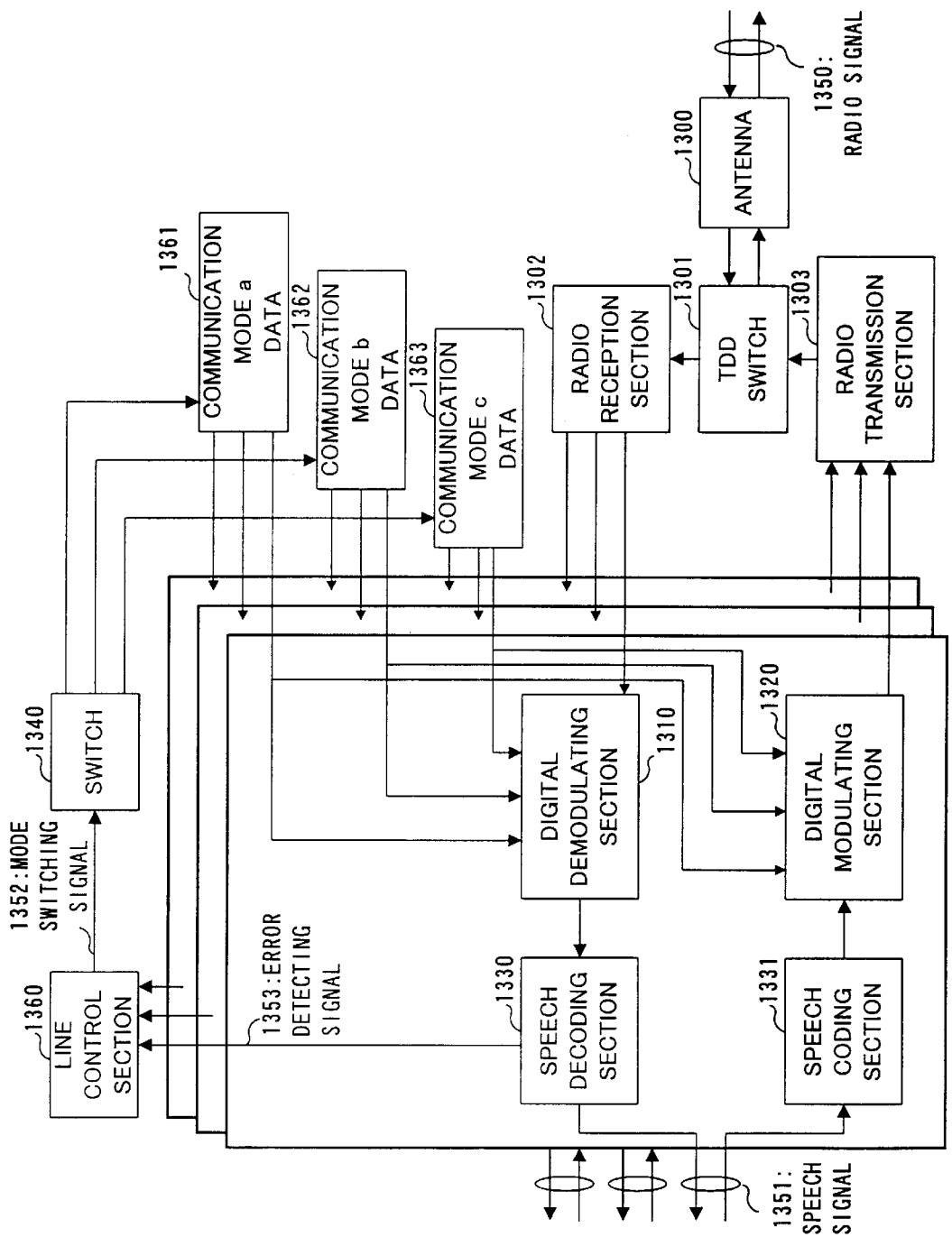
FIG. 17 is a diagram illustrating a configuration of a base station apparatus in a digital mobile communication system in the seventh and ninth embodiments of the present invention.

FIG. 17 illustrates an exemplary configuration of a base station apparatus in a digital mobile communication system using a CDMA system and a TDMA system in the seventh embodiment of the present invention. The apparatus performs a communication of a voice signal, comprising three communication modes each having a different ratio of a reverse link burst length and a forward link burst length. In FIG. 17, 1300 is an antenna to transmit and receive radio signal 1350, and 1301 is a time division duplex switch to switch radio reception section 1302 and radio transmission section 1303 in time division. Radio reception section 1302 distributes a signal to transmit to digital demodulating section 1310 in a block of each channel. Switch 1340 switches the data used in digital demodulating section 1310 to any of communication mode a data 1361, communication mode data b 1362 or communication mode data c 1363. 1330 is a voice decoding section and 1331 is a voice coding section. The voice coded signal is switched by switch 1340, and connected to digital modulating section 1320 using communication mode a data 1361, communication mode data b 1362 or communication mode data c 1363. 1351 is a voice signal. 1352 is a mode switching signal to instruct which communication mode is used. 1353 is an error detecting signal to estimate the path communication quality of a communication link.

An explanation is given to an operation of a base station apparatus in a digital mobile communication system using a CDMA system and a TDMA system configured as described above. Radio signal 1350 transmitted from a mobile station in a reverse link is received in antenna 1300 and inputted to radio reception section 1302 via time division duplex switch 1301. The signal down-converted to a baseband frequency in radio reception section 1302 is distributed to a block of each channel and demodulated in a digital demodulating section. The detailed operations of a digital demodulating section is different depending on the communication mode, and the data for the operation is switched by mode switching signal 1352. And communication mode a data 1361, communication mode b data 1362 or communication mode c data 1362 is used. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode a illustrated in FIG. 10 in which a reverse link burst length is longer than forward link burst length. In the case of using communication mode a, communication mode a data 1361 is transmitted to digital demodulating section 1310. In the case of using communication mode b, communication mode b data 1362 is transmitted to digital demodulating section 1310. In the case of using communication mode c, communication mode c data 1363 is transmitted to digital demodulating section 1310. The digital demodulated signal is transmitted to voice decoding section 1330. Voice decoding section 1330 reproduces voice signal 1351 in the reverse link from reverse link user information bits, while monitoring reverse link communication control bits, reading the error detection information in the forward link, performing the error detection in the reverse link to transmit error detecting signal 1353 to line control section 1360. Line control section decides the assignment of communication mode to each channel using the error detection information in the reverse link and forward link of each channel to instruct to the block of each channel by mode switching signal 1352. Voice signal 1351 for a forward link is voice coded in voice coding section 1331 to be forward link user information bits, which are transmitted to a digital modulating section with forward link communication control bits including error detecting signal. Switch 1340 transmits according to mode switching signal 1352 communication mode data a 1361 to digital modulating section 1320 in the case of using communication mode a, communication mode data b 1362 to digital modulating section 1320 in the case of using communication mode b and communication data c data to digital modulating section 1320 in the case of communication mode c. The digital modulated signal is upconverted to a carrier frequency in radio transmission section 1303 and transmitted to a base station apparatus from antenna 1300 via time division duplex switch 1301.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the seventh embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Although the above explanation is given to the case where the assignment of a carrier frequency is fixed, it is preferable that a base station comprises a section to detect the demand of each communication mode, and corrects the assignment automatically at a certain interval.

Eighth Embodiment

Figure 1:
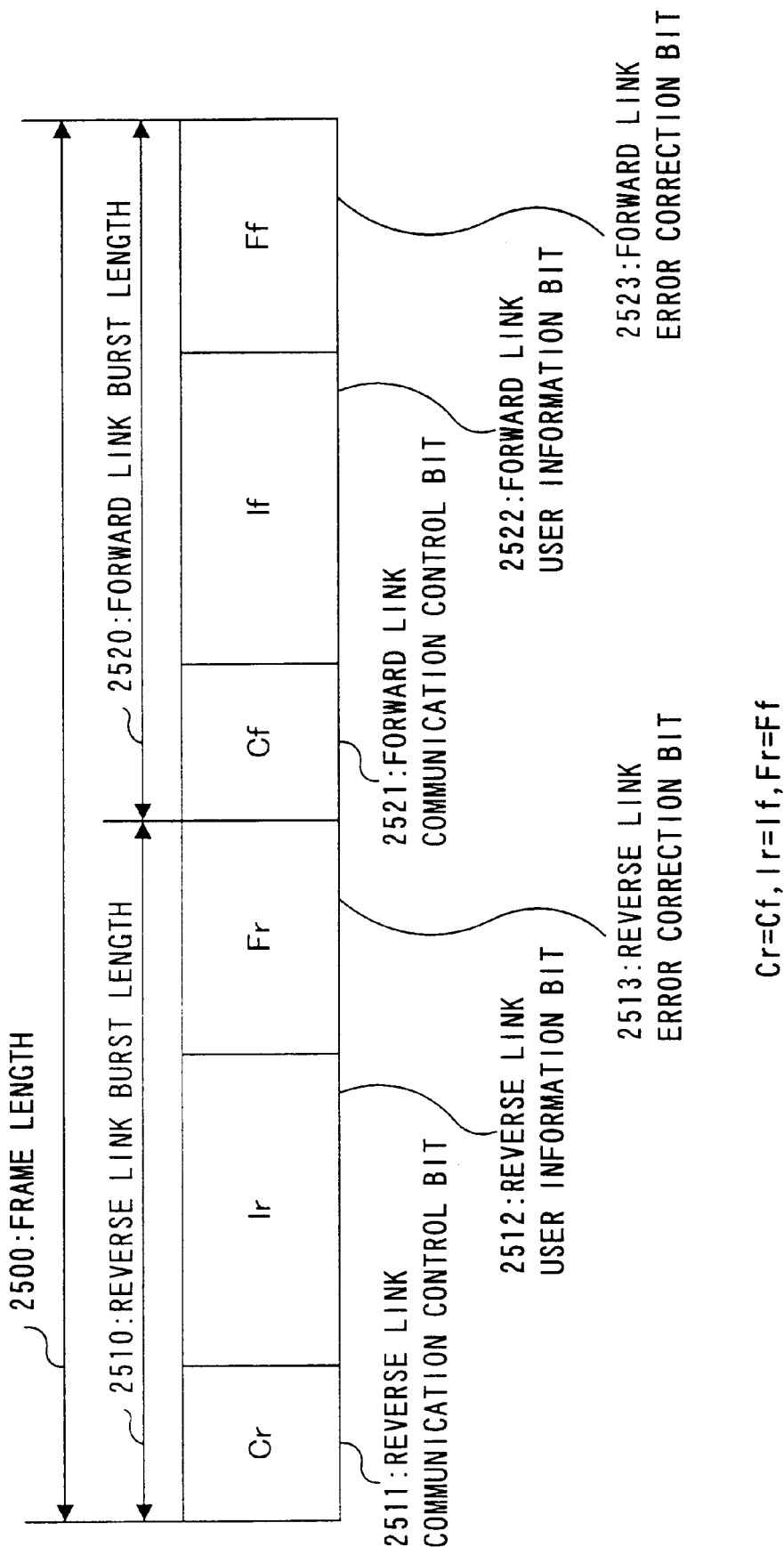
FIG. 1 is a frame construction diagram in a conventional digital mobile communication system using a TDD system.

The frame configuration illustrated in FIG. 1 is used as one of the three frame configurations in a digital mobile communication apparatus using a CDMA system and a TDMA system in the eighth embodiment of the present invention. In FIG. 1 a frame is composed of a reverse link burst and a forward link burst. Frame length 2500 is a sum of reverse link burst length 2510 and forward link burst length 2520. The reverse link burst is composed of reverse link communication control bits 2511, reverse link user information bits 2512 and reverse link error correction bits 2513. The forward link burst is composed of forward link communication control bits 2521, forward link user information bits 2522 and forward link error correction bits 2523. When the bits number of reverse link communication control bits 2511 is referred to Cr and the bits number of forward link communication control bits 2521 is referred to Cf, Cf and Cr and are equal. When the bits number of reverse link user information bits 2512 is referred to Ir and the bits number of forward link user information control bits 2522 is referred to If, Ir and If are equal. When the bits number of reverse link error correction bits 2513 is referred to Fr and the bits number of forward link error correction bits 2523 is referred to Ff, Fr and Ff are equal. Accordingly, forward link burst length 2520, which is a sum of forward link communication control bits 2521, forward link user information bits 2522 and forward link error correction bits 2523, and reverse link burst length 2510, which is a sum of reverse link communication control bits 2511, reverse link user information bits 2512, and reverse link error correction bits 2513 are equal.

Figure 18:
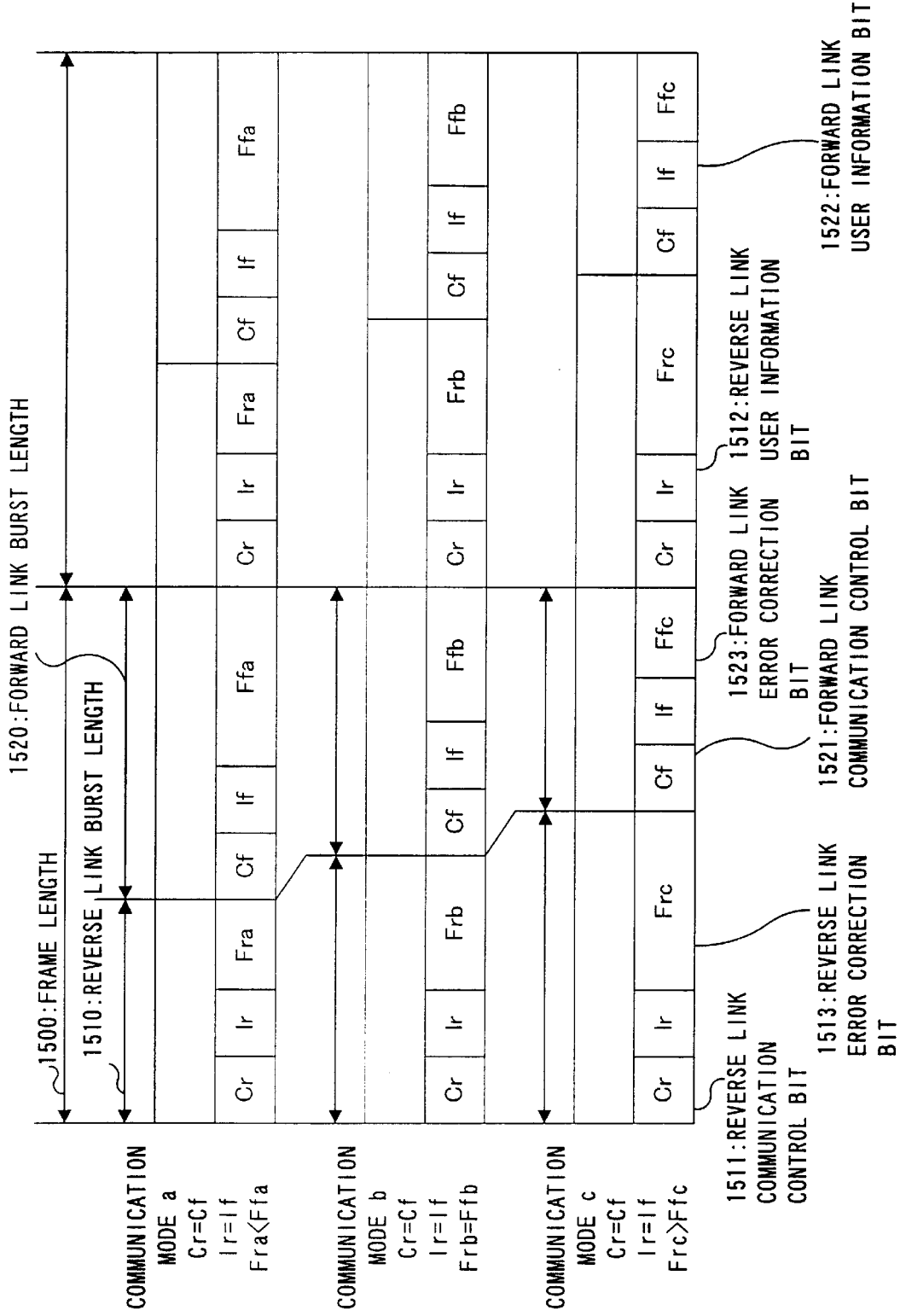
FIG. 18 is a frame construction diagram in a digital mobile communication system in the eighth embodiment of the present invention.

FIG. 18 illustrates an exemplary configuration frame in a digital mobile communication apparatus using a TDMA system comprising three of frame configurations of the above frame configuration and the two frame configurations described in the second embodiment. In communication mode a, the bits number of reverse link communication control bits Cr and the bits number of forward link communication control bits Cf are equal, the bits number of reverse link user information bits Ir and the bits number of forward link user bits If are equal, and the bits number of forward link error correction bits Ffa is larger than the bits number of reverse link error correction bits Fra. Accordingly, the forward link burst length is longer than the reverse link burst length in communication mode a. In communication mode b, the bits number of reverse link communication control bits Cr and the bits number of forward link communication control bits cf are equal, the bits number of reverse link user information bits Ir and the bits number of forward link user information If are equal, and the bits number of reverse link error correction bits Frb and the bits number of forward link error correction bits Ffb are also equal. Accordingly, the reverse link burst length and the forward link burst length are equal in communication mode b. In communication mode c, the bits number of reverse link communication control bits Cr and the bits number of forward link communication control bits Cf are equal, the bits number of reverse link user information bits Ir and the bits number of forward link user information bits If are equal, and the bits number of reverse link error correction bits Frc is larger than the bits number of forward link error correction bits Ffc. Accordingly the reverse link burst length is longer than the forward link burst length in communication mode c.

And in a communication between a certain mobile station and a base station, in the case where the path communication quality of a reverse link is lower than that of a forward link, a channel using communication mode a is assigned to the mobile station. On the contrary, in the case where the path communication quality of a forward link is lower than that of a reverse link, a channel using communication mode c is assigned to the mobile station. And in the case where the path communication quality of a reverse link and that of forward link are almost equal, a channel using communication mode b is assigned to the mobile station.

FIG. 11 is used to explain an operation in a mobile communication system configured as described above. FIG. 11 is a concept diagram of a cellular mobile communication system. In FIG. 11, a system is composed three cells of cell a 731 under the control of base station a 741, cell b 732 under the control of base station b 742 and cell c 733 under the control of base station c 743. Mobile station a 751, mobile station b 752 and mobile station c 753 are located in cell a 731. Mobile station d 754 and mobile station e 755 are located in cell b 732. Mobile station f 756 a and mobile station g 757 are located in cell c 733. In area a 761, the path communication quality of the forward link is lower than that of the reverse link. In area b 742 and area c 763, the path communication quality of the reverse link is lower than that of the forward link. In other areas, the path communication qualities of the reverse link and forward link are almost equal.

Cell a 731 includes area a 761 and area a 762. Base station a 741 uses in a plurality of carrier frequencies under the control some for communication mode a, the others for communication mode b and the rest for communication mode c. When mobile station c 753 in area a 761 requires a connection, the base station assigns a channel of the carrier frequency with communication mode a. When mobile station b 752 in area b 762 requires a connection, the base station assigns a channel of the carrier frequency with communication mode c. When mobile station a 751 not in either of area a 761 or area b 762 requires a connection, the base station assigns a channel of the carrier frequency with communication mode b. From which area a connection is required is estimated by examining the path communication qualities of the reverse link and forward link using a control channel. In the case where mobile station c 753 transits out of area a 761, the base station detects the transition, and switches a channel of the carrier frequency with communication mode a to a channel of the carrier frequency with communication mode b, if possible. Further in the case where mobile station c 753 transits out of area b 762, the base station detects the transition, and switches a channel of the carrier frequency with communication mode b to a channel of the carrier frequency with communication mode c, if possible. The above manner is the same as the other mobile stations.

Cell b 732 includes area c 763. Base station b 742 uses in a plurality of carrier frequencies under the control some for communication mode b and the rest for communication mode c. When mobile station d 754 in area c 763 requires a connection, the base station assigns a channel of the carrier frequency with communication mode c. When mobile station e 755 not in area c 763 requires a connection, the base station assigns a channel of the carrier frequency with communication mode b. From which area a connection is required is estimated by examining the path communication qualities of the reverse link and forward link using a control channel. In the case where mobile station e 755 transits out of area c 763, the base station detects the transition, and switch a channel of the carrier frequency with communication mode b to a channel of the carrier frequency with communication mode c, if possible. The above manner is the same as the other mobile stations.

Cell c 733 includes area b 762. Base station c 743 uses in a plurality of carrier frequencies under the control some for communication mode b and the rest for communication mode c. The assignment of a channel to a mobile station is the same as the above-mentioned manner.

In the case where the path communication quality of a forward link is lower than that of a reverse link, a channel of the carrier frequency with a communication mode a is assigned. In the case where the path communication quality of a reverse link is lower than that of a forward link, a channel of the carrier frequency with a communication mode c is assigned. In the case where the path communication Qualities of a reverse link and forward link are almost equal, a channel of the carrier frequency with communication mode b. In those cases, by the effect described in the fifth embodiment and sixth embodiment, it is possible to make the path communication qualities of user information of a reverse link and forward link equal. And it is preferable to make the path communication qualities of user information of a reverse link and forward link equal, in a reverse link and forward link by improving the path communication quality of the communication link with lower communication quality of user information, however which might result in the decrease of the path communication quality of the communication link with higher communication quality of user information. Because, in a CDMA system, that increases the number of channels communicable at the same time, and the communication capacity of channel.

As described above, according to the eighth embodiment of the present invention, it is possible to make the path communication qualities of user information of a reverse link and forward link in the case where the path communication qualities of a reverse link and forward link are not equal, by comprising the communication mode in which a reverse link burst length is longer than a forward link burst length, the communication mode in which a forward link burst length is longer than a reverse link burst length and the communication mode in which a reverse link burst length and forward link burst length are equal.

Figure 19:
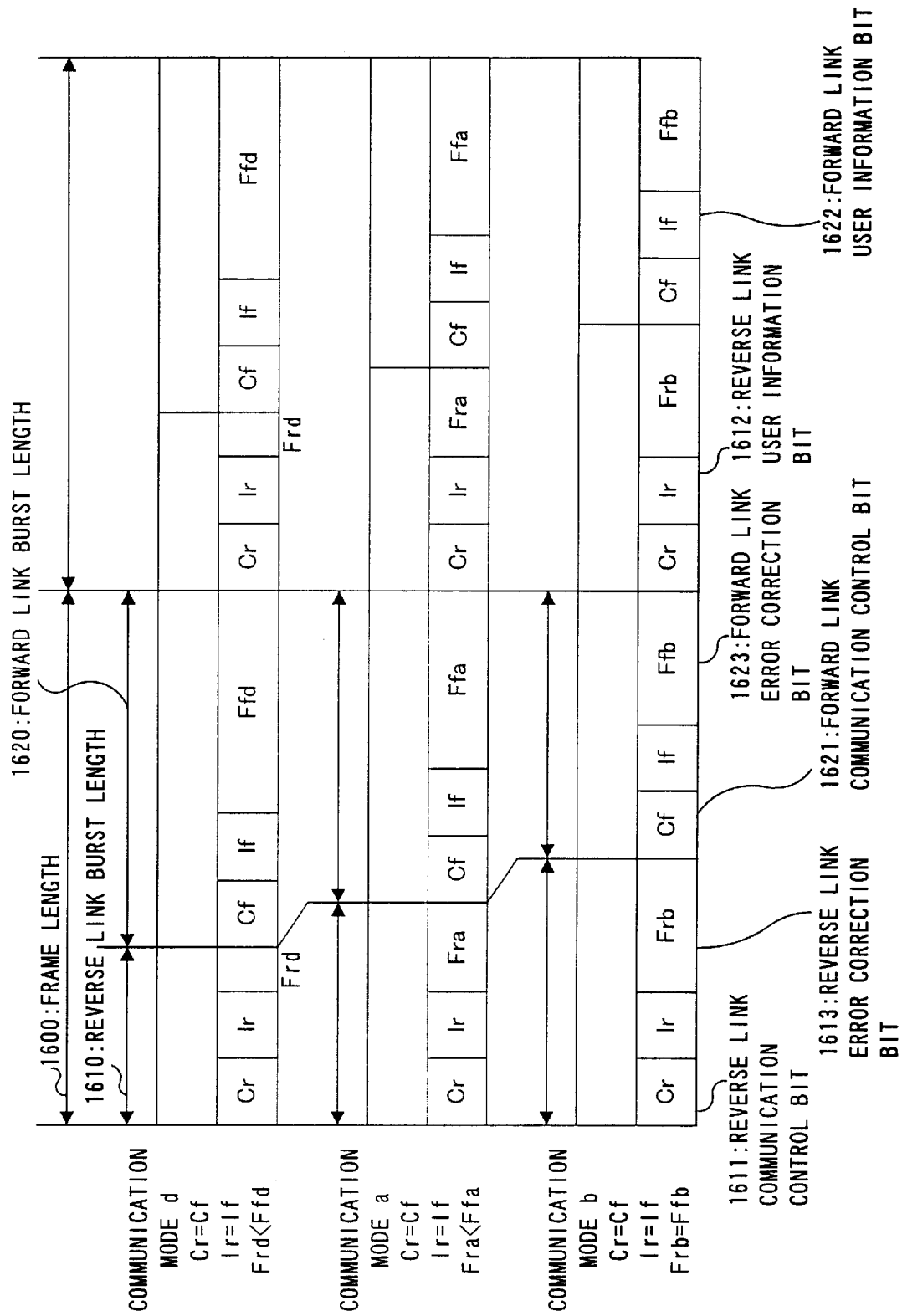
FIG. 19 is a frame construction diagram in a digital mobile communication system in the eighth embodiment of the present invention.
Figure 20:
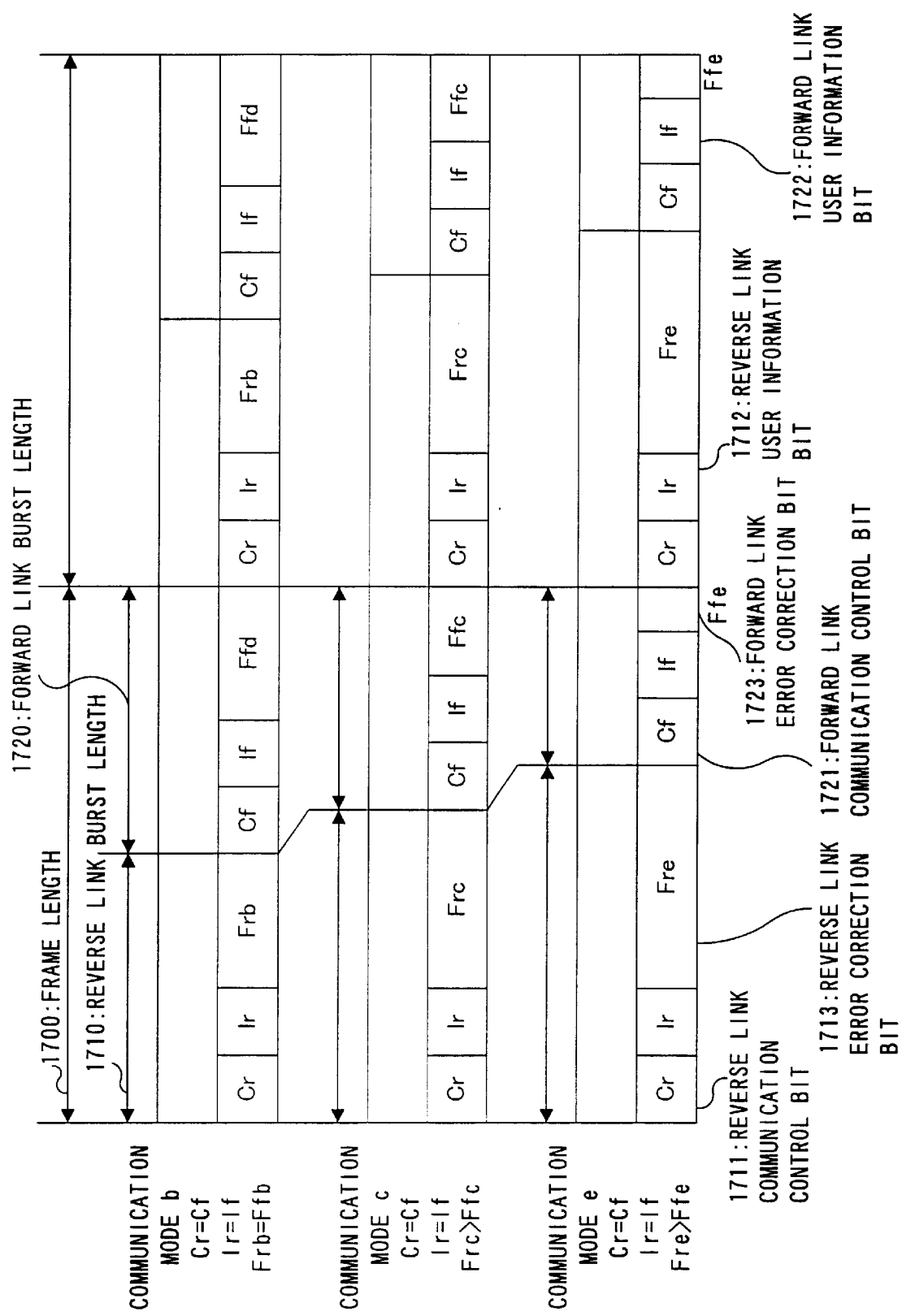
FIG. 20 is a frame construction diagram in a digital mobile communication system in the eighth embodiment of the present invention.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 19, it is preferable to practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 20, it is preferable to practice the configuration comprising the three modes of communication mode b in which a reverse link burst length and a forward link burst length are equal, communication mode c in which a reverse link burst length is longer than a reverse link burst length and communication mode d in which a reverse link burst length is further longer than a forward link burst length. And it is also preferable to practice the configuration comprising two of those systems or more than four systems.

Although the above explanation is given to the case where the assignment of a carrier frequency is fixed, it is preferable that a base station comprises a section to detect the demand of each communication mode, and corrects the assignment automatically at a certain interval.

And the above explanation is given the configuration where the relation of a reverse link burst length and a forward link in all frames is in the case as illustrated in FIG. 19 and FIG. 20. However it is preferable to practice the configuration where such configuration is only in some frames while a reverse link burst length and a forward link burst length are equal in the other frames.

In the above explanation, it is assumed that the communication traffics of a reverse link and forward link are equal, so that the explanation is given to the configuration where the bits number of reverse link user information bits is equal to that of forward link user information bits. However it is preferable to practice the configuration where the bits number of reverse link user information bits is more than that of forward link user information bits, or the bits number of reverse link user information bits is less than that of forward link user information bits. It is further preferable to practice the case where the above configuration is prepared only in some frames.

The above explanation is given to the configuration where reverse link communication control bits are prepared before reverse link user information bits, and both are completely separated. However, it is preferable to practice the configuration where reverse link communication control bits are prepared after reverse link user information bits, or the configuration where reverse link communication control bits and reverse link user information bits are separated into some portions, and each of them is prepared alternately in the reverse link burst. The above configurations are applicable to forward link communication bits and forward link user information bits. It is also preferable to practice the case where the above configurations are prepared only in some frames.

Figure 21:
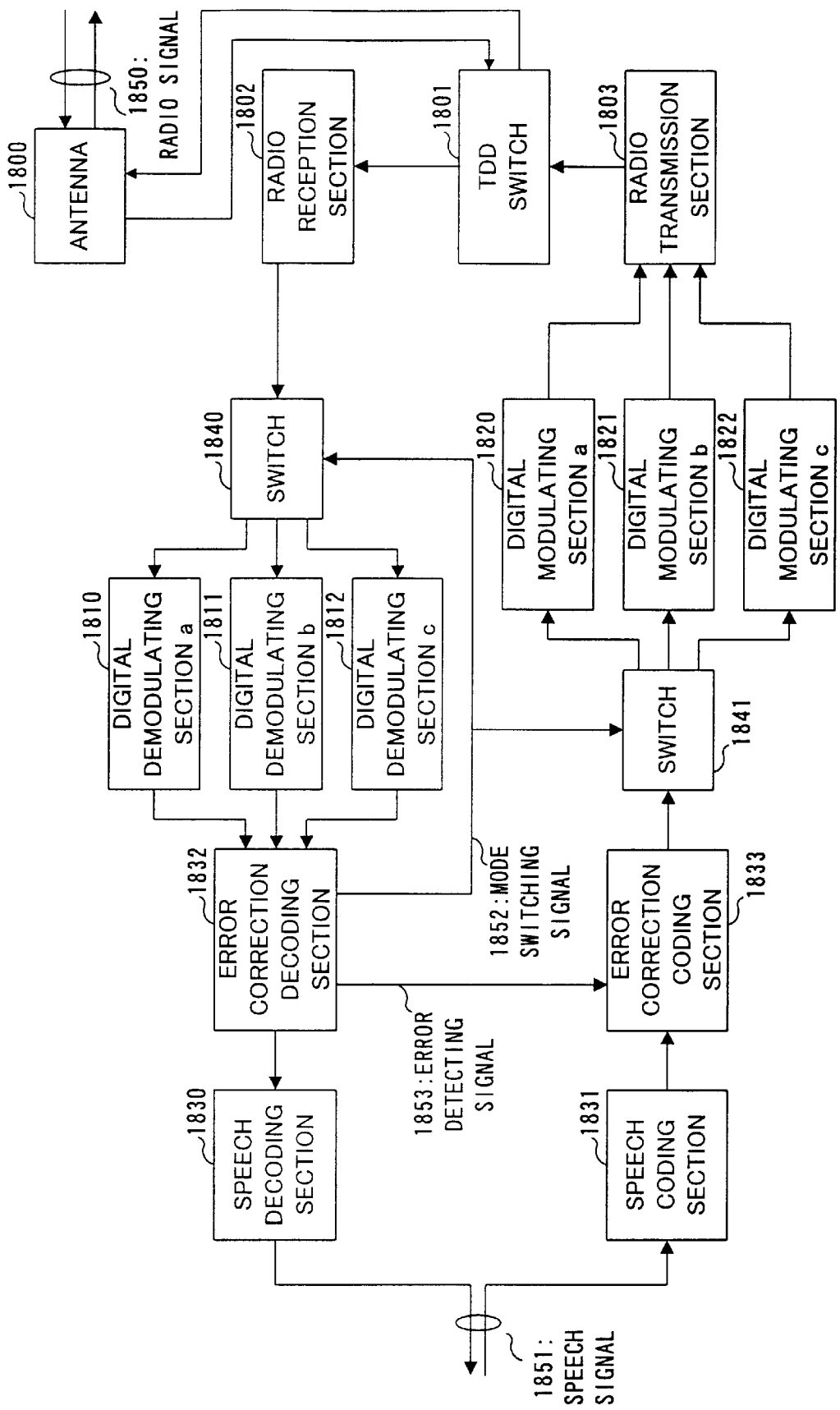
FIG. 21 is a diagram illustrating a configuration of a mobile station apparatus in a digital mobile communication system in the eighth embodiment of the present invention.

FIG. 21 illustrates an exemplary configuration of a mobile station apparatus in a digital mobile communication system using a CDMA system and a TDMA system. The apparatus performs a communication of a voice signal comprising three communication modes each having a different ratio of a reverse link burst length and a forward link burst length. In FIG. 21, 1800 is an antenna to transmit and receive radio signal 1850, and 1801 is a time division duplex switch to switch radio reception section 1802 and radio transmission section 1803 in time division. Radio reception section 1802 is switched by switch 1840, and connected to any of digital demodulating section a 1818, digital demodulating section b 1811 or digital demodulating section c 1812. 1830 is a voice decoding section and 1831 is a voice coding section. 1832 is an error correction decoding section, and 1833 is an error correction coding section. The voice coded signal is switched by switch 1841, and connected to any of digital modulating section a 1820, digital modulating section b 1821 or digital modulating section c 1822. 1851 is a voice signal. 1852 is a mode switching signal to instruct which communication mode is used. 1853 is an error detecting signal to estimate the path communication quality of a communication link.

An explanation is given to an operation of a mobile station apparatus in a digital mobile communication system using a CDMA system and a TDMA system configured as described above. Radio signal 1850 transmitted from a base station in a forward link is received in antenna 1800 and inputted to radio reception section 1802 via time division duplex switch 1801. The signal down-converted to a baseband frequency in radio reception section 1802 is demodulated such as despreading in a digital demodulating section. A digital demodulating section is different depending on the communication mode, and is switched to any of digital demodulating section a 1818, digital demodulating section b 1811 and digital demodulating section c 1812 by mode switching signal 1852. The connection is provided to digital demodulating section a 1810 in the case of using communication mode a, digital demodulating section b 1811 in the case of using communication mode b, and digital demodulating section c 1812 in the case of using communication mode c. Communication mode a is communication mode a illustrated in FIG. 18 in which a forward link burst length is longer than a reverse link burst length. Communication mode b is communication mode b illustrated in FIG. 18 in which a forward link burst length and a reverse link burst length are equal. Communication mode c is communication mode a illustrated in FIG. 18 in which a reverse link burst length is longer than forward link burst length. The digital demodulated signal is inputted to error correction decoding section 1832. Error correction decoding section 1832 performs to the signal error correction decoding and generates forward user information bits to transmit to voice coding section 1830. Error correction decoding section 1832 also monitors forward link communication control bits, performs the instruction of mode switching signal 1852 and error detection and transmit error detecting signal 1853 to error correction coding section 1833. Voice decoding section 1830 reproduces voice signal 1851 in the forward link from forward link user information bits. Voice signal 1851 for a reverse link is voice coded in voice coding section 1831 to be error correction coding section 1833. Error correction coding section 1833 provides the error correction coding to reverse link communication control bits including user information bits and error detecting signal, which are switched in switch 1841 and transmitted to a digital demodulating section. Switch 1841 performs the switching according to mode switching signal 1852 to digital modulating section a 1820 in communication mode a, digital modulating section b 1821 in communication mode b and digital modulating section c 1822 in communication mode c. The digital modulated signal processed in a digital modulating section by such as spreading is upconverted to a carrier frequency in radio transmission section 1803 and transmitted to a base station apparatus from antenna 1800 via time division duplex switch 1801.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link equal even in the case where the path communication qualities in a reverse link and forward link are different. As a result, the communication capacity of a channel is increased as described in the seventh embodiment and others.

As described above, according to the eighth embodiment of the present invention, since a mobile station apparatus has the configuration capable of responding some communication modes in which the ratio of a reverse link burst length and a forward link burst length is different and the code rate of error correction coding is different, it is possible to make the path communication qualities of user information of a reverse link and a forward link equal in the case where the path communication qualities in a reverse link and a forward link are different. That allows increasing the number of channels communicable at the same time.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 19, it is preferable to practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 20, it is preferable to practice the configuration comprising the three modes of communication mode b in which a reverse link burst length and a forward link burst length are equal, communication mode c in which a reverse link burst length is a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 19 and FIG. 20. However it is preferable to practice the configuration where such configuration is only in some frames while a reverse link burst length and a forward link burst length are equal in the other frames.

Figure 22:
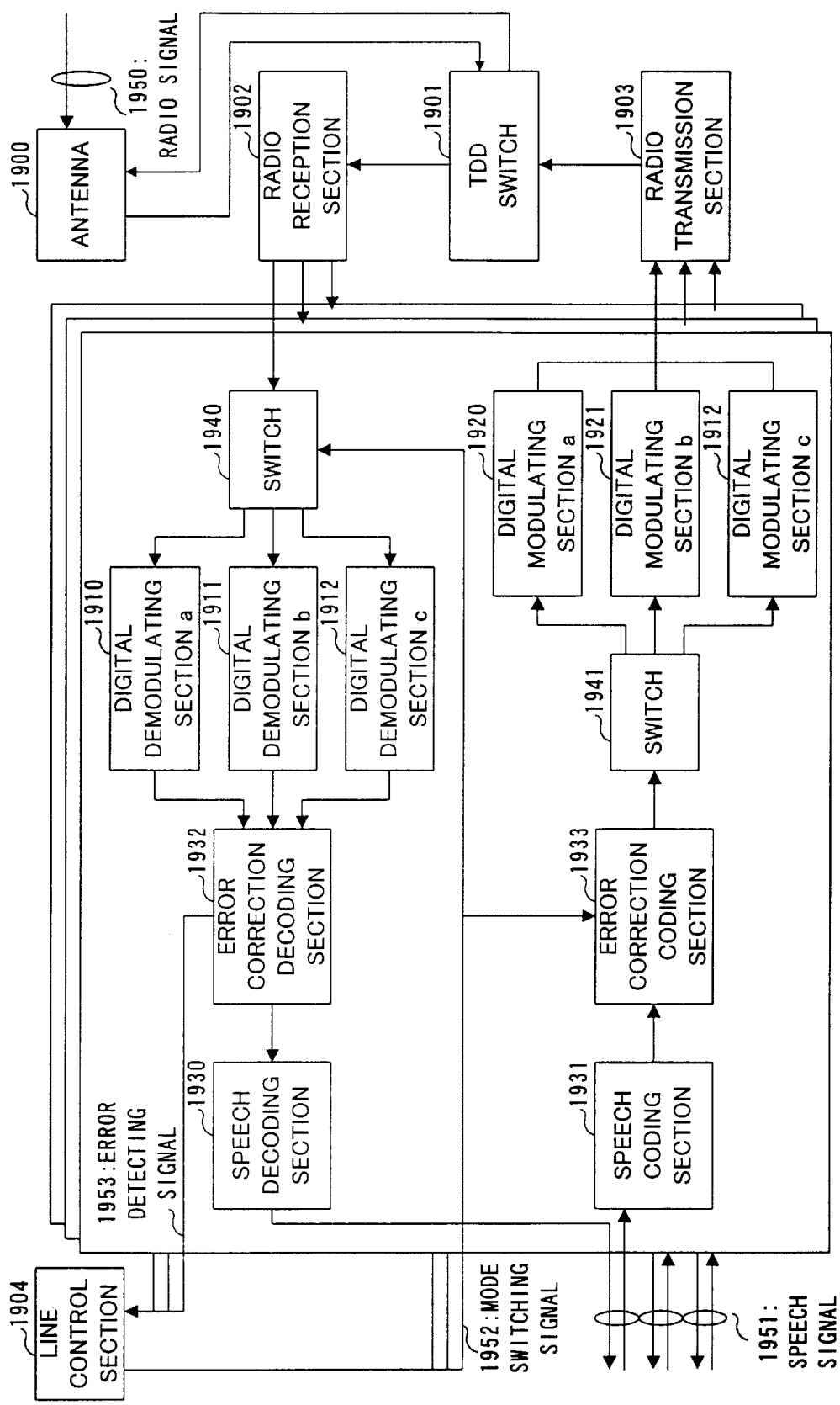
FIG. 22 is a diagram illustrating a configuration of a base station apparatus in a digital mobile communication system in the eighth embodiment of the present invention.

FIG. 22 illustrates an exemplary configuration of a base station apparatus in a digital mobile communication system using a CDMA system and a TDMA system in the eighth embodiment of the present invention. It is assumed that the apparatus performs a communication of a voice signal comprising three communication modes each having a different ratio of a reverse link burst length and a forward link burst length. In FIG. 22, 1900 is an antenna to transmit t and receive radio signal 1950, and 1901 is a time division duplex switch to switch radio reception section 1902 and radio transmission section 1903 in time division. Radio reception section 1902 distributes a signal to transmit to a block of each channel. In a block of each channel, the connection is performed by switch 1940 to any of digital demodulating section a 1910, digital demodulating section b 1919 or digital demodulating section c 1912. 1930 is a voice decoding section and 1931 is a voice coding section. 1932 is an error correction decoding section, and 1933 is an error correction coding section. The voice coded signal is switched by switch 1941, and connected to any of digital modulating section a 1920, digital modulating section b 1921 or digital modulating section c 1922. 1904 is a line control section to control the assignment of a channel and so on by monitoring an error detecting signal and so on of each channel. 1951 is a voice signal. 1952 is a mode switching signal to instruct which communication mode is used. 1953 is an error detecting signal to estimate the path communication quality of a communication link.

An explanation is given to an operation of a base station apparatus in a digital mobile communication system using a CDMA system and a TDMA system configured as described above. Radio signal 1950 transmitted from a mobile station in a reverse link is received in antenna 1900 and inputted to radio reception section 1902 via time division duplex switch 1901. The signal down-converted to a baseband frequency in radio reception section 1902 is distributed to each channel and transmitted to a digital demodulating section. A digital demodulating section is different depending on the communication mode, and is switched to any of digital demodulating section a 1910, digital demodulating section b 1911 and digital demodulating section c 1912 by mode switching signal 1952. The connection is provided to digital demodulating section a 1910 in the case of using communication mode a, digital demodulating section b 1911 in the case of using communication mode b, and digital demodulating section c 1912 in the case of using communication mode c. Communication mode a is communication mode a illustrated in FIG. 18 in which a forward link burst length is longer than a reverse link burst length. Communication mode b is communication mode b illustrated in FIG. 18 in which a forward link burst length and a reverse link burst length are equal. Communication mode c is communication mode c illustrated in FIG. 18 in which a reverse link burst length is longer than forward link burst length. The signal processed in a digital demodulating section by the despreading is inputted to error correction decoding section 1932. Error correction decoding section 1932 processes the error correction decoding and generates reverse link user information bits to transmit to voice decoding section 1930. Error correction decoding section 1932 also monitors reverse link communication control bits, , reads forward link error detecting information in a forward link, performing the error detection in a reverse link, and performs the error correction in reverse link to transmit error detecting signal 1953 to line control section 1904. Line control section 1904 decides the assignment of a communication mode to each channel using the error detection information of each channel in the reverse link and forward link and instructs to a block of each channel by mode switching signal 1952. Voice decoding section 1930 reproduces voice signal 1951 in the reverse link using reverse link user information bits. Voice signal 1951 in the forward link is voice coded in voice coding section 1931 to be forward link user information bits, which are transmitted to error correction coding section 1933. Error correction coding section 1933 provides the error correction coding to user information bits and forward link communication control bits, which are switched by switch 1941 and transmitted to digital demodulating section. Switch 1941 performs the switching according to mode switching signal 1952 to digital modulating section a 1920 in communication mode a, digital modulating section b 1921 in communication mode b and digital modulating section c 1922 in communication mode c. The digital modulated signal spread in a digital modulating section is each channel synthesized, upconverted to a carrier frequency in radio transmission section 1903 and transmitted to a mobile station from antenna 1900 via time division duplex switch 1901.

Thus it is possible to use communication mode c in which a reverse link has a longer burst length and lower code rate than a forward link in the case where the path communication quality of the reverse link is lower than that of the forward link, to use communication mode a in which a forward link has a longer burst length and lower code rate of error correction than a reverse link in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link even in the case where the path communication qualities in a reverse link and forward link are different. As a result, the communication capacity of a channel is increased as described in the seventh embodiment and others.

As described above, according to the eighth embodiment of the present invention, since a mobile station apparatus has the configuration capable of responding some communication modes in which the ratio of a reverse link burst length and a forward link burst length is different and the code rate of error correction coding is different, it is possible to make the path communication qualities of user information of a reverse link and a forward link equal in the case where the path communication qualities in a reverse link and a forward link are different. That allows increasing the number of channels communicable at the same time.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 19, it is preferable to practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 20, it is preferable to practice the configuration comprising the three modes of communication mode b in which a reverse link burst length and a forward link burst length are equal, communication mode c in which a reverse link burst length is a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 19 and FIG. 20. However it is preferable to practice the configuration where such configuration is only in some frames while a reverse link burst length and a forward link burst length are equal in the other frames.

Although the above explanation is given to the case where the assignment of a carrier frequency to each communication mode is fixed, it is preferable that a base station comprises a section to detect the demand of each communication mode, and corrects the assignments automatically at a certain interval.

Figure 23:
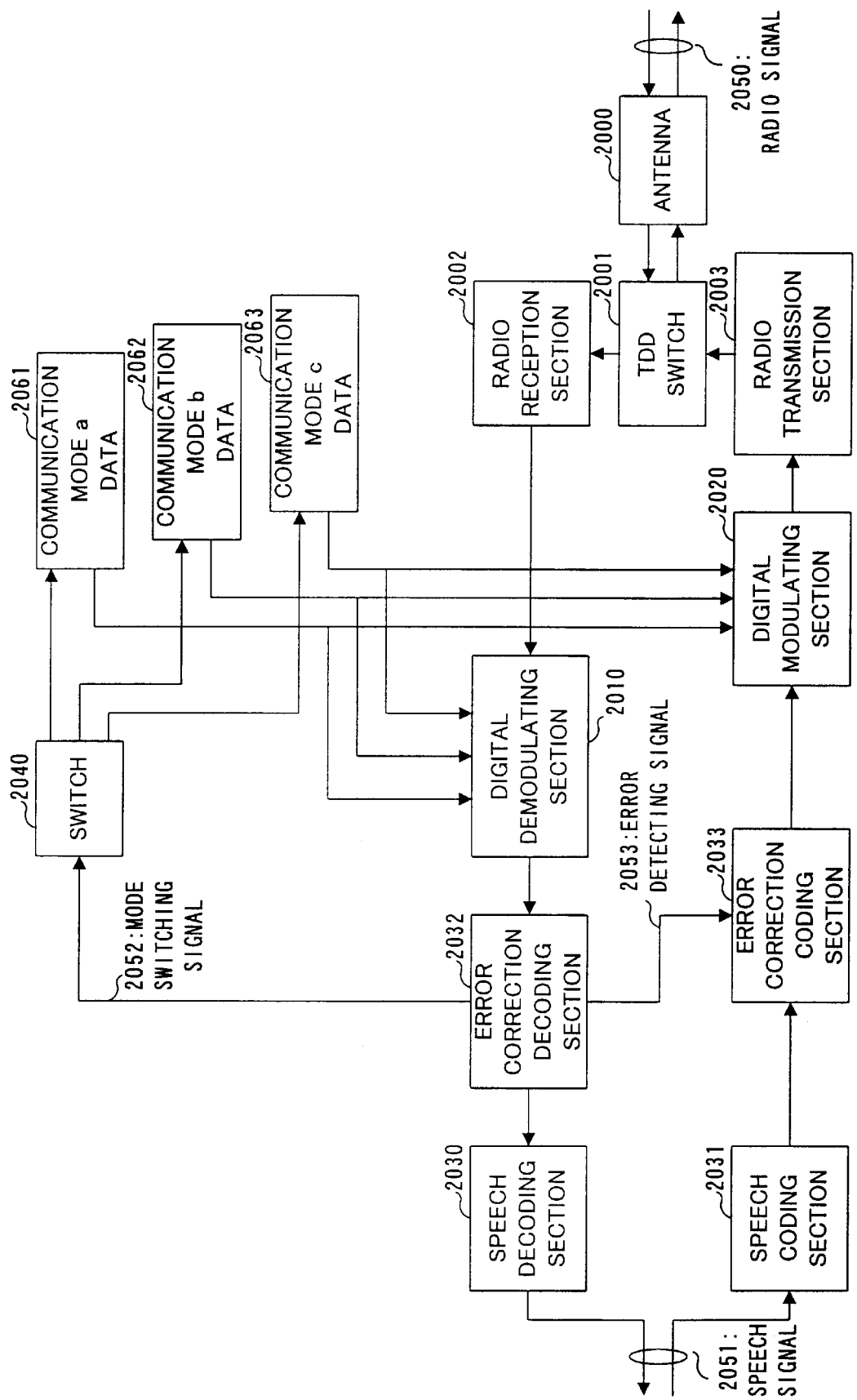
FIG. 23 is a diagram illustrating a configuration of a mobile station apparatus in a digital mobile communication system in the eighth embodiment of the present invention.
Figure 24:
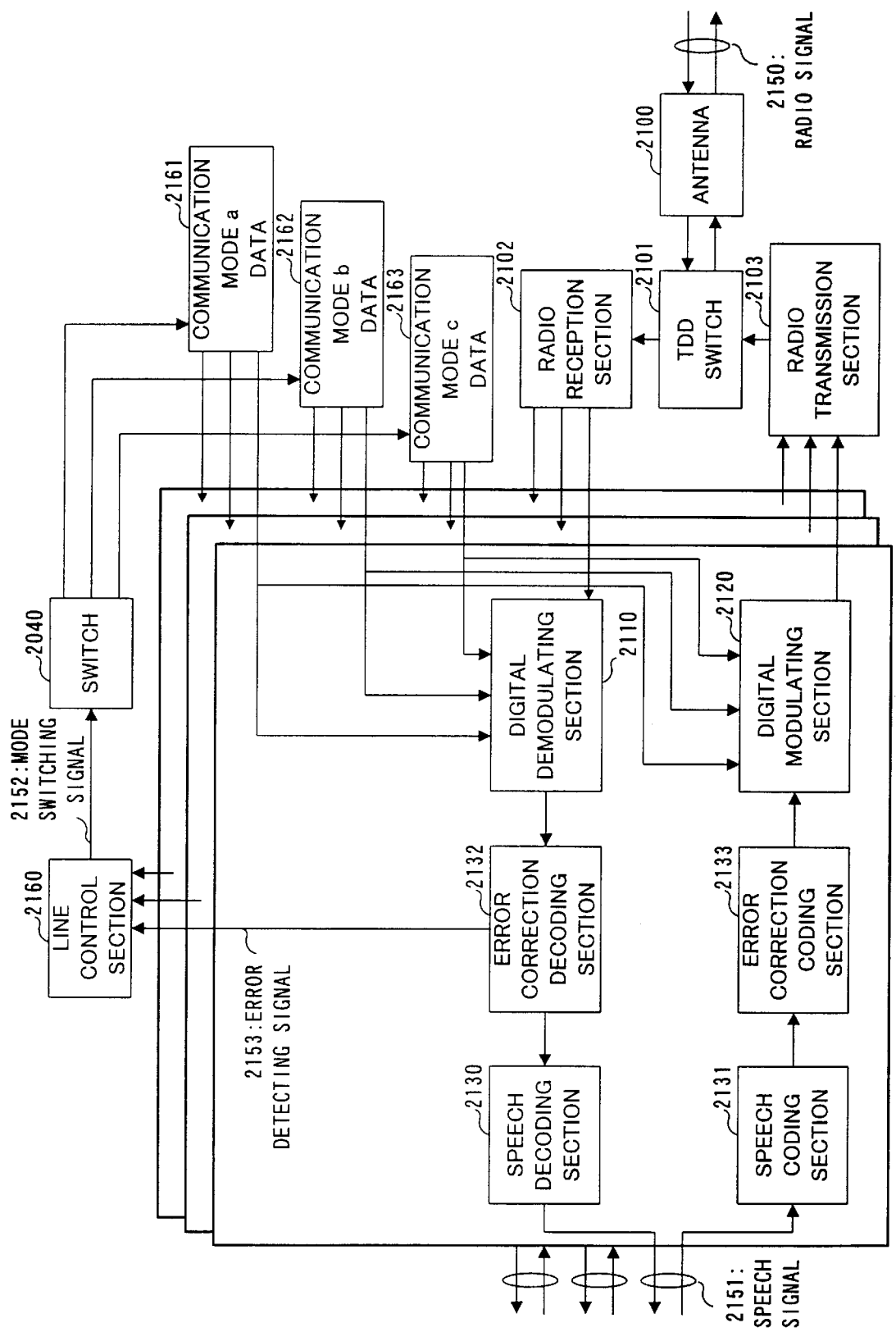
FIG. 24 is a diagram illustrating a configuration of a base station apparatus in a digital mobile communication system in the eighth embodiment of the present invention.

FIG. 23 illustrates an exemplary configuration of a mobile station apparatus in a digital mobile communication system using a CDMA system and a TDMA system in the eighth embodiment of the present invention. It is assumed that the apparatus performs a communication of a voice signal, comprising three communication modes each having a different ratio of a reverse link burst length and a forward link burst length. In FIG. 23, 2000 is an antenna to transmit and receive radio signal 2050, and 2001 is a time division duplex switch to switch radio reception section 2002 and radio transmission section 2003 in time division. Radio reception section 2002 is connected with digital demodulation section 2010. Switch 2040 switches the data to be used in digital demodulating section 2010 to any of communication mode a data 2061, communication mode b data 2062 and communication mode c data 2063. 2030 is a voice decoding section and 2031 is a voice coding section. 2032 is an error correction decoding section, and 2033 is an error correction coding section. The voice coded signal is connected to digital demodulating section 2020 using any of communication mode a data 2061, communication mode b data 2063 or communication mode c data 2063 switched by switch 2040. 2051 is a voice signal. 2052 is a mode switching signal to instruct which communication mode is used. 2053 is an error detecting signal to estimate the path communication quality of a communication link.

An explanation is given to an operation of a mobile station apparatus in a digital mobile communication system using a CDMA system and a TDMA system configured as described above. Radio signal 2050 transmitted from a base station in a forward link is received in antenna 2000 and inputted to radio reception section 2002 via time division duplex switch 2001. The signal down-converted to a baseband frequency in radio reception section 2002 is transmitted to a digital demodulating section. The detailed operation in the digital demodulating section differs depending on the communication mode. The data for the operation is switched by switch 2040 according to mode switching signal 2052, and any of communication mode a data 2061, communication mode b data 2062 or communication mode c data 2063 is used. Communication mode a is communication mode a illustrated in FIG. 18 in which a forward link burst length is longer than a reverse link burst length. Communication mode b is communication mode b illustrated in FIG. 18 in which a forward link burst length and a reverse link burst length are equal. Communication mode c is communication mode c illustrated in FIG. 18 in which a reverse link burst length is longer than forward link burst length. Communication mode a data 2061 are transmitted to digital demodulating section 2010 in the case of using communication mode a, communication mode b data 2062 is transmitted to digital demodulating section 2010 in the case of using communication mode b, and communication mode c data 2063 is transmitted to digital demodulating section in the case of using communication mode c. The signal processed such as despreading in digital demodulating section 2010 is inputted to error correction decoding section 2032. Error correction decoding section 2032 processes the error correction decoding and generates forward link user information bits to transmit to voice decoding section 2030. Error correction decoding section 2032 also monitors forward link communication control bits, performs the instruction of mode switching signal 2052 and the error detection, transmits error detecting signal 2053 to error correction coding section 2033. Voice decoding section 2030 reproduces voice signal 2051 in the forward link using forward link user information bits. Voice signal 2051 in the reverse link is voice coded in voice coding section 2031 to be reverse link user information bits, and is processed by the error correction coding along with reverse link communication control bits including error detecting signal to transmit digital demodulating section 2020. Switch 2040 transmits according to mode switching signal 2052 communication mode a data 2061 to digital modulating section 2020 in the case of using communication mode a, communication mode b data 2062 Lo digital modulating section 2020 in the case of using communication mode b and communication mode c data 2063 to digital modulating section 2020 in the case of using communication mode c. The signal modulated such as spread in a digital modulating section is upconverted to a carrier frequency in radio transmission section 2003 and transmitted to a base station apparatus from antenna 2000 via time division duplex switch 2001.

Thus it is possible to use a channel with communication mode c in which a reverse link has longer burst length and lower code rate of error correction than a forward link in the case where the path communication quality of the reverse link is lower than that of the forward link, to use a channel with communication mode a in which a forward link has a longer burst length and lower code rate of error correction than a reverse link in the case where the path communication quality of the forward link is lower than that of reverse link, and to use a channel with communication mode b in which a reverse link burst length and a forward link burst length are equal in the case where the path communication qualities of the reverse link and forward link are equal. Accordingly, it is possible to make the communication quality of user information bits in a reverse link and forward link equal even in the case where the path communication qualities in a reverse link and forward link are different. As a result, the number of channels communicable at the same time is increased as described in the seventh embodiment and others.

As described above, according to the eighth embodiment of the present invention, since a mobile station apparatus has the configuration capable of responding some communication modes in which the ratio of a reverse link burst length and a forward link burst length is different and the code rate of error correction coding is different, it is possible to make the path communication qualities of user information of a reverse link and a forward link equal in the case where the path communication qualities in a reverse link and a forward link are different. That allows increasing of the number of channels communicable at the same time.

In addition, the above explanation is given to the case of comprising the three modes of the communication mode in which a reverse link burst length is longer than a forward link burst length, the communication mode in which a forward link burst length is longer than a reverse link burst length and the communication mode in which reverse link burst length and forward link burst length are equal. However as illustrated in FIG. 19, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 20, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 19 and FIG. 20. However it is preferable to practice the configuration where such configuration is only in some frames while a reverse link burst length and a forward link burst length are equal in the other frames.

FIG. 21 illustrates an exemplary configuration of a base station apparatus in a digital mobile communication system using a CDMA system and a TDMA system in the eighth embodiment of the present invention. It is assumed that the apparatus performs a communication of a voice signal, comprising three communication modes each having a different ratio of a reverse link burst length and a forward link burst length. In FIG. 21, 2100 is an antenna to transmit and receive radio signal 2150, and 2101 is a time division duplex switch to switch radio reception section 2102 and radio transmission section 2103 in time division. Radio reception section 2102 is connected with digital demodulation section 2110 in a block for each channel by distributing a signal. Switch 2140 switches the data to be used in digital demodulating section 2110 to any of communication mode a data 2161, communication mode b data 2162 and communication mode c data 2163. 2130 is a voice decoding section and 2131 is a voice coding section. 2132 is an error correction decoding section, and 2133 is an error correction coding section. The voice coded signal is connected to digital demodulating section 2120 using any of communication mode a data 2061, communication mode b data 2063 or communication mode c data 2063 switched by switch 2140. 2151 is a voice signal. 2152 is a mode switching signal to instruct which communication mode is used. 2153 is an error detecting signal to estimate the path communication quality of a communication link.

An explanation is given to an operation of a base station apparatus in a digital mobile communication system using a CDMA system and a TDMA system configured as described above. Radio signal 2150 transmitted from a mobile station in a reverse link is received in antenna 2100 and inputted to radio reception section 2102 via time division duplex switch 2101. The signal down-converted to a baseband frequency in radio reception section 2102 is distributed to a block for each channel and transmitted to a digital demodulating section. The detailed operation in the digital demodulating section differs depending on the communication mode. The data for the operation is switched by switch 2140 according to mode switching signal 2152, and any of communication mode a data 2161, communication mode b data 2162 or communication mode c data 2163 is used. Communication mode a data 2161 is transmitted to digital demodulating section 2110 in the case of using communication mode a. Communication mode b data 2162 is transmitted to digital demodulating section 2110 in the case of using communication mode b. Communication mode c data 2163 is transmitted to digital demodulating section 2110 in the case of using communication mode c. Communication mode a is communication mode a illustrated in FIG. 18 in which a forward link burst length is longer than a reverse link burst length. Communication mode b is communication mode b illustrated in FIG. 18 in which a forward link burst length and a reverse link burst length are equal.

Communication mode c is communication mode c illustrated in FIG. 18 in which a reverse link burst length is longer than forward link burst length. The signal processed such as despreading in the digital demodulating section is inputted to error correction decoding section 2132. Error correction decoding section 2132 processes the error correction decoding and generates reverse link user information bits to transmit to voice decoding section 2130. Error correction decoding section 2132 also monitors reverse link communication control bits, reads the error detection information in the forward link, performs the error detection for the reverse link, and transmits error detecting signal 2153 to error line control section 2160. Line control section 2160 decides the assignment of communication modes to each channel, using the error detection information in the forward link and the reverse link in each channel. Voice decoding section 2130 reproduces voice signal 2151 in the reverse link using reverse link user information bits. Voice signal 2151 in the forward link is voice coded in voice coding section 2131 to be forward link user information bits, and is transmitted to error correction coding section 2133. Error correction coding section 2133 performs the error correction coding on forward link user information bits and forward link communication control bits to transmit digital modulating section 2120. Switch 2140 transmits according to mode switching signal 2152 communication mode a data 2161 to digital modulating section 2121 in the case of using communication mode a, communication mode b data 2162 to digital modulating section 2121 in the case of using communication mode b and communication mode c data 2163 to digital modulating section 2121 in the case of using communication mode c. The signal modulated such as spread in digital modulating section 2120 is channel combined and upconverted to a carrier frequency in radio transmission section 2103, and transmitted to a mobile station apparatus from antenna 2100 via time division duplex switch 2101.

Thus it is possible to use a channel with communication mode c in which a reverse link has longer burst length and lower code rate of error correction than a forward link in the case where the path communication quality of the reverse link is lower than that of the forward link, to use a channel with communication mode a in which a forward link has a longer burst length and lower code rate of error correction than a reverse link in the case where the path communication quality of the forward link is lower than that of reverse link, and to use a channel with communication mode b in which a reverse link burst length and a forward link burst length are equal in the case where the path communication qualities of the reverse link and forward link are equal.

Accordingly, it is possible to make the communication quality of user information bits in a reverse link and forward link almost equal even in the case where the path communication qualities in a reverse link and forward link are different. As a result, the number of channels communicable at the same time is increased as described in the seventh embodiment and others.

As described above, according to the eighth embodiment of the present invention, since a mobile station apparatus has the configuration capable of responding some communication modes in which the ratio of a reverse link burst length and a forward link burst length is different and the code rate of error correction coding is different, it is possible to make the path communication qualities of user information of a reverse link and a forward link equal in the case where the path communication qualities in a reverse link and a forward link are different. That allows increasing the number of channels communicable at the same time.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 19, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 20, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 19 and FIG. 20. However it is preferable to practice the configuration where such configuration is only in some frames while a reverse link burst length and a forward link burst length are equal in other frames.

Although the above explanation is given to the case where the assignment of a carrier frequency to each communication mode is fixed, it is preferable that a base station comprises a section to detect the demand of each communication mode, and corrects the assignments automatically at a certain interval.

Ninth Embodiment

Figure 25:
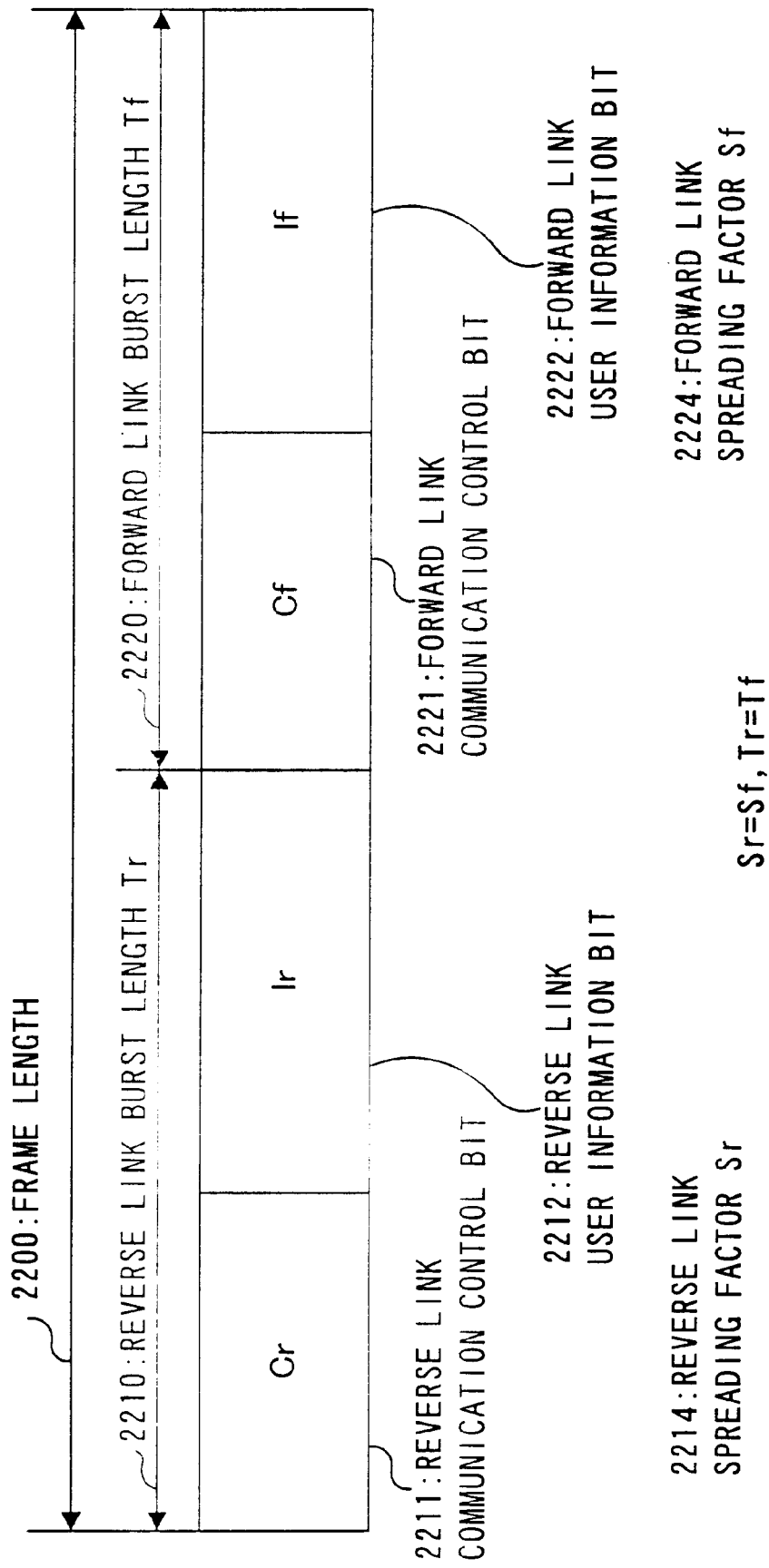
FIG. 25 is a frame construction diagram in digital mobile communication system in the ninth embodiment of the present invention.

FIG. 25 illustrates an exemplary frame configuration in a digital mobile communication apparatus using a CDMA system and a TDD system. In FIG. 25, a frame is composed of a reverse link burst and a forward link burst. Frame length 2200 is a sum of reverse link burst length 2210 and forward link burst length 2220. Reverse link burst length is referred to Tr, and forward link burst length is referred to Tf. The reverse link burst is composed of reverse link communication control bits 2211 and reverse link user information bits 2212. The forward link burst is composed of forward link communication control bits 2221 and forward link user information bits 2222. The bits number of reverse link communication control bits 2211 and forward link communication control bits 2221 is referred to C, the bits number of reverse link user information bits 2212 and forward link user information control bits 2222 is referred to I. Reverse link spreading factor 2214 is referred to Sr, and forward link spreading factor 2224 is referred to Sf, and it is assumed that Sf and Sr are equal. Since the bits number of communication control bits in the reverse link and those in the forward link are equal, forward link burst length 2220 and reverse link burst length 2210 are equal when forward link spreading factor Sf 2224 and reverse link spreading factor Sr 2214 are equal.

An explanation is given to digital mobile communication apparatus in a CDMA system and a TDMA system comprising three frame configurations of communication mode b described above, and communication mode a and communication mode c described in the third embodiment. The bits number of communication control bits and the bits number of user information bits are the same in communication mode a, communication mode b and communication mode c. The spreading factor is different between the above three modes. In communication mode a, a forward link burst length is longer than a reverse link burst length because a forward link spreading factor is larger than a reverse link spreading factor. In communication mode b, a reverse link burst length and a forward link burst length are equal because a reverse link spreading factor and a forward link spreading factor are equal. In communication mode c, a reverse link burst length is longer than a forward link burst length because a reverse link spreading factor is larger than a forward link spreading factor.

And in a communication between a certain mobile station and a base station, in the case where the path communication quality of a reverse link is lower than that of a forward link, a channel using communication mode c is assigned to the mobile station. On the contrary, in the case where the path communication quality of a forward link is lower than that of a reverse link, a channel using communication mode a is assigned to the mobile station. And in the case where the path communication quality of a reverse link and that of a forward link are almost equal, a channel using communication mode b is assigned to the mobile station. FIG. 11 is used to explain an operation in a mobile communication system configured as described above. FIG. 11 is a concept diagram of a cellular mobile communication system. In FIG. 11, a system is composed three cells of cell a 731 under the control of base station a 741, cell b 732 under the control of base station b 742 and cell c 733 under the control of base station c 743. Mobile station a 751, mobile station b 752 and mobile station c 753 are located in cell a 731. Mobile station d 754 and mobile station e 755 are located in cell b 732. Mobile station f 756 and mobile station g 757 are located in cell c 733. In area a 761, the path communication quality of the forward link is lower than that of the reverse link. In area b 742 and area c 763, the path communication quality of the reverse link is lower than that of the forward link. In other areas, the path communication qualities of the reverse link and forward link are almost equal.

Cell a 731 includes area a 761 and area b 762. Base station a 741 uses, from among a plurality of carrier frequencies under the control, some for communication mode a, the others for communication mode b and the rest for communication mode c. When mobile station c 753 in area a 761 requires a connection, the base station assigns a channel of the carrier frequency with communication mode a. When mobile station b 752 in area b 762 requires a connection, the base station assigns a channel of the carrier frequency with communication mode c. When mobile station a 751 not in either of area a 761 or area b 762 requires a connection, the base station assigns a channel of the carrier frequency with communication mode b. From which area a connection is required is estimated by examining the path communication qualities of the reverse link and forward link using a control channel. In the case where mobile station c 753 transits out of area a 761, the base station detects the transition, and switches the channel of the carrier frequency with communication mode a to the channel of the carrier frequency with communication mode b, if possible. Further in the case where mobile station c 753 transits out of area b 762, the base station detects the transition, and switches the channel of the carrier frequency with communication mode b to the channel of the carrier frequency with communication mode c, if possible. The above manner is the same as the other mobile stations.

Cell b 732 includes area c 763. Base station b 742 uses, from among a plurality of carrier frequencies under the control, some for communication mode b and the rest for communication mode c. When mobile station d 754 in area c 763 requires a connection, the base station assigns the channel of the carrier frequency with communication mode c. When mobile station e 755 not in area c 763 requires a connection, the base station assigns the channel of the carrier frequency with communication mode b. From which area a connection is required is estimated by examining the path communication qualities of the reverse link and forward link using a control channel. In the case where mobile station e 755 transits out of area c 763, the base station detects the transition, and switches the channel of the carrier frequency with communication mode b to the channel of the carrier frequency with communication mode c, if possible. The above manner is the same as the other mobile stations.

Cell c 733 includes area b 762. Base station c 743 uses, from among a plurality of carrier frequencies under the control, some for communication mode b and the rest for communication mode c. The assignment of a channel to a mobile station is the same as the above-mentioned manner.

In the case where the path communication quality of a forward link is lower than that of a reverse link, a channel of the carrier frequency with a communication mode a is assigned. In the case where the path communication quality of a reverse link is lower than that of a forward link, a channel of the carrier frequency with a communication mode c is assigned. In the case where the path communication qualities of a reverse link and forward link are almost equal, a channel of the carrier frequency with communication mode b is assigned. In those cases, by the effect described in the fifth embodiment and the sixth embodiment, it is possible to make the path communication qualities of user information of a reverse link and forward link equal. And it is preferable to make the path communication qualities of user information of a reverse link and forward link equal, by improving the path communication quality of the communication link with lower communication quality of user information in a reverse link and forward link, however which might result in the decrease of the path communication quality of the communication link with higher communication quality of user information. Because, in a CDMA system, that increases the number of channels communicable at the same time, and the communication capacity of channel.

As described above, according to the ninth embodiment of the present invention, it is possible to make the path communication qualities of user information of a reverse link and forward link equal in the case where the path communication qualities of a reverse link and forward link are not equal, by comprising the communication mode in which a reverse link burst length is longer than a forward link burst length and a reverse link spreading factor is larger than a forward link spreading factor, the communication mode in which a forward link burst length is longer than a reverse link burst length and a forward link spreading factor is larger than a reverse link spreading factor, and the communication mode in which a reverse link burst length and forward link burst length are equal and a reverse link spreading factor and a forward link spreading factor are equal.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However it is preferable to practice the configuration comprising the three modes of a communication mode in which a reverse link burst length and a forward link burst length are equal, a communication mode in which a forward link burst length is longer than a reverse link burst length and communication mode d in which a forward link burst length is further longer than a reverse link burst length. It is also preferable to practice the configuration comprising the three modes of a communication mode in which a reverse link burst length and a forward link burst length are equal, a communication mode in which a reverse link burst length is longer than a forward link burst length and a communication mode in which a reverse link burst length is further longer than a forward link burst length. And it is also preferable to practice the configuration comprising two of those systems or more than four systems.

Although the above explanation is given to the case where the assignment of a carrier frequency is fixed, it is preferable that a base station comprises a section to detect the demand of each communication mode, and corrects the assignment automatically at a certain interval.

And the above explanation is given the configuration where the relation of a reverse link burst length and a forward link in all frames is in the case as illustrated in FIG. 25, FIG. 7 or FIG. 8. However it is preferable to practice the configuration where such configuration Is only in some frames while a reverse link burst length and a forward link burst length are equal in the other frames.

In the above explanation, it is assumed that the communication traffics of a reverse link and forward link are equal, so that the explanation is given to the configuration where the bits number of reverse link user information bits is equal to that of forward link user information bits. However it is preferable to practice the configuration where the bits number of reverse link user information bits is more than that of forward link user information bits, or the bits number of reverse link user information bits is less than that of forward link user information bits. It is further preferable to practice the case where the above configuration is prepared only in some frames.

The above explanation is given to the configuration where reverse link communication control bits are prepared before reverse link user information bits, and both are completely separated. However, it is preferable to practice the configuration where reverse link communication control bits are prepared after reverse link user information bits, or the configuration where reverse link communication control bits and reverse link user information bits are separated into some portions, and each of them is prepared alternately in the reverse link burst. The above configurations are applicable to forward link communication bits and forward link user information bits. It is also preferable to practice the case where the above configurations are prepared only in some frames.

FIG. 14 illustrates an exemplary configuration of a mobile station apparatus in a digital mobile communication system using a CDMA system and a TDMA system in the ninth embodiment of the present invention. The apparatus performs a communication of a voice signal, comprising three communication modes each having a different ratio of a reverse link burst length and a forward link burst length. In FIG. 14, 1000 is an antenna to transmit and receive radio signal 1050, and 1001 is a time division duplex switch to switch radio reception section 1002 and radio transmission section 1003 in time division. Radio reception section 1002 is switched by switch 1040, and connected to any of digital demodulating section a 1010, digital demodulating section b 1011 or digital demodulating section c 1012. 1030 is a voice decoding section and 1031 is a voice coding section. The voice coded signal is switched by switch 1041, and connected to any of digital modulating section a 1020, digital modulating section b 1021 or digital modulating section c 1022. 1051 is a voice signal. 1052 is a mode switching signal to instruct which communication mode is used. 1053 is an error detecting signal to estimate the path communication quality of a communication link.

An explanation is given to an operation of a mobile station apparatus in a digital mobile communication system using a CDMA system and a TDMA system configured as described above. Radio signal 1050 transmitted from a base station in a forward link is received in antenna 1000 and inputted to radio reception section 1002 via time division duplex switch 1001. The signal down-converted to a baseband frequency in radio reception section 1002 is demodulated in a digital demodulating section. A digital demodulating section is different depending on the communication mode, and is switched to any of digital demodulating section a 1010, digital demodulating section b 1011 and digital demodulating section ac 1012 by mode switching signal 1052. The connection is provided to digital demodulating section a 1010 in the case of using communication mode a, digital demodulating section b 1011 in the case of using communication mode b, and digital demodulating section c 1012 in the case of using communication mode c. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode a illustrated in FIG. 10 in which a reverse link burst length is longer than forward link burst length. The digital demodulated signal is inputted to voice decoding section 1030. Voice decoding section 1030 reproduces voice signal 1051 in the forward link from forward link user information bits, while monitoring forward link communication control bits, performing the instruction of mode switching signal 1052 and the error detection to transmit error detecting signal 1053 to voice coding section 1031. Voice signal 1051 for a reverse link is voice coded in voice coding section 1031 to be reverse link user information bits, which are switched by switch 1041 with reverse link communication control bits including error detecting signal to transmit to a digital modulating section. Switch 1041 performs the switching according to mode switching signal 1052 to digital modulating section a 1020 in communication mode a, digital modulating section b 1021 in communication mode b and digital modulating section c 1022 in communication mode c. The digital modulated signal is upconverted to a carrier frequency in radio transmission section 1003 and transmitted to a base station apparatus from antenna 1000 via time division duplex switch 1001.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, t is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the ninth embodiment of the present invention, since a mobile station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse ink burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given to the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

FIG. 15 illustrates an exemplary configuration of a base station apparatus in a digital mobile communication system using a CDMA system and a TDMA system in the ninth embodiment of the present invention. The apparatus performs a communication of a voice signal, comprising three communication modes each having a different ratio of a reverse link burst length and a forward link burst length. In FIG. 15, 1100 is an antenna to transmit and receive radio signal 1150, and 1101 is a time division duplex switch to switch radio reception section 1102 and radio transmission section 1103 in time division. Radio reception section 1102 distributes a signal to transmit to a block of each channel. In the block of each channel, the switching is performed by switch 1140 to connect to any of digital demodulating section a 1110, digital demodulating section b 1111 or digital demodulating section c 1112. 1130 is a voice decoding section and 1131 is a voice coding section. The voice coded signal is switched by switch 1141, and connected to any of digital modulating section a 1120, digital modulating section b 1121 or digital modulating section c 1122. 1104 is a line control section to control the assignment of a channel and so on by monitoring an error detecting signal and so on of each channel. 1151 is a voice signal. 1152 is a mode switching signal to instruct which communication mode is used. 1153 is an error detecting signal to estimate the path communication quality of a communication link.

An explanation is given to an operation of a base station apparatus in a digital mobile communication system using a CDMA system and a TDMA system configured as described above. Radio signal 1150 transmitted from a mobile station in a reverse link is received in antenna 1100 and inputted to radio reception section 1102 via time division duplex switch 1101. The signal down-converted to a baseband frequency in radio reception section 1102 is distributed to each channel and demodulated in a digital demodulating section. A digital demodulating section is different depending on the communication mode, and is switched to any of digital demodulating section a 1110, digital demodulating section b 1111 and digital demodulating section c 1112 by mode switching signal 1152. The connection is provided to digital demodulating section a 1110 in the case of using communication mode a, digital demodulating section b 1111 in the case of using communication mode b, and digital demodulating section c 1112 in the case of using communication mode c. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode c illustrated in FIG. 10 in which a reverse link burst length is longer than forward link burst length. The digital demodulated signal is inputted to voice decoding section 1130. Voice decoding section 1130 reproduces voice signal 1151 in the reverse link from reverse link user information bits, while monitoring reverse link communication control bits, reading the error detecting information in a forward link, performing the error detection in a reverse link to transmit error detecting signal 1153 to line control section 1104. Line control section 1104 decides the assignment of a communication mode to each channel using the error detection information of each channel in the reverse link and forward link to instruct to a block of each channel by mode switching signal 1152. Voice signal 1151 for a forward link is voice coded in voice coding section 1131 to be forward link user information bits, which are switched by switch 1141 along with forward link communication control bits to transmit to a digital modulating section. Switch 1141 performs the switching according to mode switching signal 1152 to digital modulating section a 1120 in communication mode a, digital modulating section b 1121 in communication mode b and digital modulating section c 1122 in communication mode c. The digital modulated s signal is each channel combined, upconverted to a carrier frequency in radio transmission section 1103 and transmitted to a base station from antenna 1100 via time division duplex switch 1101.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the ninfth embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Although the above explanation is given to the case where the assignment of a carrier frequency is fixed, it is preferable that a base station comprises a section to detect the demand of each communication mode, and corrects the assignment automatically at a certain interval.

FIG. 16 illustrates an exemplary configuration of a mobile station apparatus in a digital mobile communication system using a CDMA system and a TDMA system in the ninth embodiment of the present invention. The apparatus performs a communication of a voice signal, comprising three communication modes each having a different ratio of a reverse link burst length and a forward link burst length. In FIG. 16, 1200 is an antenna to transmit and receive radio signal 1250, and 1201 is a time division duplex switch to switch radio reception section 1202 and radio transmission section 1203 in time division. Radio reception section 1202 is connected to digital demodulating section 1210. Switch 1240 switches the data used in digital demodulating section 1210 to any of communication mode a data 1261, communication mode data b 1262 or communication mode data c 1263. 1230 is a voice decoding section and 1231 is a voice coding section. The voice coded signal is switched by switch 1240, and connected to digital modulating section 1220 using communication mode a data 1261, communication mode data b 1262 or communication mode data c 1263. 1251 is a voice signal. 1252 is a mode switching signal to instruct which communication mode is used. 1253 is an error detecting signal to estimate the path communication quality of a communication link.

An explanation is given to an operation of a mobile station apparatus in a digital mobile communication system using a CDMA system and a TDMA system configured as described above. Radio signal 1250 transmitted from a base station in a forward link is received in antenna 1200 and inputted to radio reception section 1202 via time division duplex switch 1201. The signal down-converted to a baseband frequency in radio reception section 1202 is demodulated in a digital demodulating section. The detailed operations of a digital demodulating section is different depending on the communication mode, and the data for the operation is switched by mode switching signal 1252. And communication mode a data 1261, communication mode b data 1262 or communication mode c data 1262 is used. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode a illustrated in FIG. 10 in which a reverse link burst length is longer than forward link burst length. In the case of using communication mode a, communication mode a data 1261 is transmitted to digital demodulating section 1210. In the case of using communication mode b, communication mode b data 1262 is transmitted to digital demodulating section 1210. In the case of using communication mode c, communication mode c data 1263 is transmitted to digital demodulating section 1210. The digital demodulated signal is transmitted to voice decoding section 1230. Voice decoding section 1230 reproduces voice signal 1251 in the forward link from forward link user information bits, while monitoring forward link communication control bits, performing the instruction of mode switching signal 1252 and the error detection to transmit error detecting signal 1253 to voice coding section 1231. Voice signal 1251 for a reverse link is voice coded in voice coding section 1231 to be reverse link user information bits, which are transmitted to a digital demodulating section with reverse link communication control bits including error detecting signal. Switch 1240 transmits according to mode switching signal 1252 communication mode data a 1261 to digital modulating section 1220 in the case of using communication mode a, communication mode data b 1262 to a digital modulating section 1220 in the case of using communication mode b and communication data c data 1263 to digital modulating section 1220 in the case of communication mode c. The digital modulated signal is upconverted to a carrier frequency in radio transmission section 1203 and transmitted to a base station apparatus from antenna 1200 via time division duplex switch 1201.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost equal even in the case where the path communication qualities in a reverse link and forward link are different. As a result, the communication capacity of a channel is increased as described in the third embodiment and others.

As described above, according to the sixth embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows increasing the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

FIG. 17 illustrates an exemplary configuration of a base station apparatus in a digital mobile communication system using a CDMA system and a TDMA system in the seventh embodiment of the present invention. The apparatus performs a communication of a voice signal, comprising three communication modes each having a different ratio of a reverse link burst length and a forward link burst length. In FIG. 17, 1300 is an antenna to transmit and receive radio signal 1350, and 1301 is a time division duplex switch to switch radio reception section 1302 and radio transmission section 1303 in time division. Radio reception section 1302 distributes a signal to transmit to digital demodulating section 1310 in a block of each channel. Switch 1340 switches the data used in digital demodulating section 1310 to any of communication mode a data 1361, communication mode data b 1362 or communication mode data c 1363. 1330 is a voice decoding section and 1331 is a voice coding section. The voice coded signal is switched by switch 1340, and connected to digital modulating section 1320 using communication mode a data 1361, communication mode data b 1362 or communication mode data c 1363. 1351 is a voice signal. 1352 is a mode switching signal to instruct which communication mode is used. 1353 is an error detecting signal to estimate the path communication quality of a communication link.

An explanation is given to an operation of a base station apparatus in a digital mobile communication system using a CDMA system and a TDMA system configured as described above. Radio signal 1350 transmitted from a mobile station in a reverse link is received in antenna 1300 and inputted to radio reception section 1302 via time division duplex switch 1301. The signal down-converted to a baseband frequency in radio reception section 1302 is distributed to a block of each channel and demodulated in a digital demodulating section. The detailed operations of a digital demodulating section is different depending on the communication mode, and the data for the operation is switched by mode switching signal 1352. And communication mode a data 1361, communication mode b data 1362 or communication mode c data 1362 is used. Communication mode a is communication mode a illustrated in FIG. 10 in which a forward link burst length is longer than a reverse link burst length. Communication mode b is communication mode b illustrated in FIG. 10 in which a forward link burst length and a reverse link burst length are equal. Communication mode c is communication mode a illustrated in FIG. 10 in which a reverse link burst length is longer than forward link burst length. In the case of using communication mode a, communication mode a data 1361 is transmitted to digital demodulating section 1310. In the case of using communication mode b, communication mode b data 1362 is transmitted to digital demodulating section 1310. In the case of using communication mode c, communication mode c data 1363 is transmitted to digital demodulating section 1310. The digital demodulated signal is transmitted to voice decoding section 1330. Voice decoding section 1330 reproduces voice signal 1351 in the reverse link from reverse link user information bits, while monitoring reverse link communication control bits, reading the error detection information in the forward link, performing the error detection in the reverse link to transmit error detecting signal 1353 to line control section 1360. Line control section decides the assignment of communication mode to each channel using the error detection information in the reverse link and forward link of each channel to instruct to the block of each channel by mode switching signal 1352. Voice signal 1351 for a forward link is voice coded in voice coding section 1331 to be forward link user information bits, which are transmitted to a digital modulating section with forward link communication control bits including error detecting signal. Switch 1340 transmits according to mode switching signal 1352 communication mode data a 1361 to digital modulating section 1320 in the case of using communication mode a, communication mode data b 1362 to a digital modulating section 1320 in the case of using communication mode b and communication data c data to digital modulating section 1320 in the case of communication mode c. The digital modulated signal is upconverted to a carrier frequency in radio transmission section 1303 and transmitted to a base station apparatus from antenna 1300 via time division duplex switch 1301.

Thus it is possible to use communication mode c in which a reverse link burst length is longer than a forward link burst length in the case where the path communication quality of the reverse link is lower than that of forward link, to use communication mode a in which a forward link burst length is longer than a reverse link burst length in the case where the path communication quality of the forward link is lower than that of reverse link, and to use communication mode b in which a reverse link burst length and a forward link burst length are equal in the case where the path communication qualities of the reverse link and forward link are equal. Accordingly, it is possible to make the communication quality of user information bits in a reverse link and forward link almost even in the case where the path communication qualities in a reverse link and forward link are different. As a result, the communication capacity of a channel is increased as described in the third embodiment and others.

As described above, according to the ninth embodiment of the present invention, since a base station apparatus has the configuration capable of responding some communication modes in which the ratio of a reverse link burst length and a forward link burst length is different, it is possible to make the path communication qualities of user information of a reverse link and a forward link equal in the case where the path communication qualities in a reverse link and a forward link are different. That allows the increases of the communication capacity of a channel.

In addition, the above explanation is given to the case of comprising the three modes of the communication mode in which a reverse link burst length is longer than a forward link burst length, the communication mode in which a forward link burst length is longer than a reverse link burst length and the communication mode in which a reverse link burst length and forward link burst length are equal. However as illustrated in FIG. 12, it is preferable to practice the configuration comprising the three modes of communication mode b in which a reverse link burst length and a forward link burst length are equal, communication mode a in which a forward link burst length is longer than a reverse link burst length and communication mode d in which a forward link burst length is further longer than a reverse link burst length. And as illustrated in FIG. 13, it is preferable to practice the configuration comprising the three modes of communication mode b in which a reverse link burst length and a forward link burst length are equal, communication mode c in which a reverse link burst length is longer than a forward link burst length and communication mode d in which a reverse link burst length is further longer than a forward link burst length. And it is also preferable to practice the configuration comprising two of those systems or more than four systems.

And the above explanation is given the configuration where the relation of a reverse link burst length and a forward link in all frames is in the case as illustrated in FIG. 12 and FIG. 13. However it is preferable to practice the configuration where such configuration is only in some frames while a reverse link burst length and a forward link burst length are equal in the other frames.

Although the above explanation is given to the case where the assignment of a carrier frequency is fixed, it is preferable that a base station comprises a section to detect the demand of each communication mode, and corrects the assignment automatically at a certain interval.

What is claimed is:

1. A radio communication apparatus for radio communicating by switching a reverse link and a forward link in a CDMA system comprising:
control means for controlling a relative ratio of burst lengths between the reverse link and the forward link corresponding to a communication quality;
switching means for switching the reverse link and the forward link corresponding to the burst lengths of the reverse link and the forward link; and
baseband processing means for changing the number of bits of specific data included in a burst of transmission data corresponding to the burst length of a communication link to be transmitted.

2. The radio communication apparatus according to claim 1, wherein in the case where there is a difference between the communication quality of the reverse link and the communication quality of the forward link, said control means controls burst lengths so that the burst length of a communication link with a lower communication quality becomes longer than the burst length of a communication link with a higher communication quality.

3. The radio communication apparatus according to claim 2, wherein the burst length is changed by increasing and decreasing the number of bits of communication control bits as said specific data.

4. The radio communication apparatus according to claim 2, wherein the burst length is changed by increasing and decreasing a code rate of an error correction code as said specific data.

5. The radio communication apparatus according to claim 2, wherein the burst length is changed by increasing and decreasing a spreading factor of user data as said specific data.

6. The radio communication apparatus according to claim 1, wherein said communication control means selects an appropriate communication mode among from a plurality of communication modes corresponding to the communication quality.

7. The radio communication apparatus according to claim 6, wherein said plurality of communication modes include a mode in which the burst length of the reverse link is shorter than the burst length of the forward link, a mode in which the burst length of the reverse link and the burst length of the forward link are equal, and a mode in which the burst length of the reverse link is longer than the burst length of the forward link.

8. The radio communication apparatus according to claim 6, wherein said plurality of communication modes include a mode in which the burst length of the reverse link is shorter than the burst length of the forward link, a mode in which the burst length of the reverse link is further shorter than the burst length of the forward link and a mode in which the burst length of the reverse link and the burst length of the forward link are equal.

9. The radio communication apparatus according to claim 6, wherein said plurality of communication modes include a mode in which the burst length of the reverse link is longer than the burst length of the forward link, a mode in which the burst length of the reverse link is further longer than the burst length of the forward link and a mode in which the burst length of the reverse link and the burst length of the forward link are equal.

10. A mobile station apparatus for radio communicating with a base station apparatus by switching a reverse link and a forward link in a CDMA system comprising:
a plurality of modulators provided in parallel each corresponding to each of a plurality of communication modes to communicate by switching the reverse link and the forward link at a certain ratio, wherein said certain ratios differ between said communication modes, each for modulating transmission data corresponding to each of said plurality of communication modes;
a plurality of demodulators provided in parallel each corresponding to each of a plurality of communication modes, for demodulating reception data corresponding to each of said plurality of communication modes; and
a switch for switching the modulator to be used in a modulation of the transmission data and the demodulator to be used in a demodulation of the reception data by an instruction from said base station.

11. The mobile station apparatus according to claim 10, wherein said plurality of communication modes include a mode in which the burst length of the reverse link is shorter than the burst length of the forward link, a mode in which the burst length of the reverse link and the burst length of the forward link are equal, and a mode in which the burst length of the reverse link is longer than the burst length of the forward link.

12. The mobile station apparatus according to claim 10, wherein said plurality of communication modes include a mode in which the burst length of the reverse link is shorter than the burst length of the forward link, a mode in which the burst length of the reverse link is further shorter than the burst length of the forward link and a mode in which the burst length of the reverse link and the burst length of the forward link are equal.

13. The mobile station apparatus according to claim 10, wherein said plurality of communication modes include a mode in which the burst length of the reverse link is longer than the burst length of the forward link, a mode in which the burst length of the reverse link is further longer than the burst length of the forward link and a mode in which the burst length of the reverse link and the burst length of the forward link are equal.

14. The mobile station apparatus according to claim 10, wherein the burst length is changed by increasing and decreasing at least one of communication control bits, a code rate of an error correction code or a spreading factor.

15. In a mobile station apparatus for radio communicating with a base station apparatus by switching a reverse link and a forward link in a CDMA system, said mobile station apparatus having the radio communication apparatus according to claim 1.

16. A mobile station apparatus for radio communicating with a base station apparatus by switching a reverse link and a forward link in a CDMA system comprising:

providing means or providing a plurality of modulation processing data and a plurality of demodulation processing data corresponding to a plurality of communication modes to communicate by switching the reverse link and the forward link at a certain ratio, wherein said certain ratios differ between said communication modes;

a modulator for modulating transmission data according to the modulation processing data provided from said providing means;

a demodulator for demodulating reception data according to the demodulation processing data provided from said providing means;

a switch for switching the modulation processing data and the demodulation processing data each to be provided to said modulator and said demodulator respectively from said providing means according to an instruction from said base station.

17. A base station apparatus for radio communicating with a mobile station apparatus by switching a reverse link and a forward link in a CDMA system comprising:

a plurality of modulators provided in parallel each corresponding to each of a plurality of communication modes to communicate by switching the reverse link and the forward link at a certain ratio, wherein said certain ratios differ between said communication modes, for modulating transmission data corresponding to each of said plurality of communication modes;

a plurality of demodulators provided in parallel each corresponding to each of a plurality of communication modes, for demodulating reception data corresponding to each of said plurality of communication modes; and means for monitoring a communication quality of the reverse link and a communication quality of the forward link, and outputting a mode switching signal to switch a communication mode corresponding to the monitored communication quality, and a switch for switching the modulator to be used in a modulation of the transmission data and the demodulator to be used in a demodulation of the reception data.

18. The base station apparatus according to claim 17, wherein said plurality of communication modes include a mode in which the burst length of the reverse link is shorter than the burst length of the forward link, a mode in which the burst length of the reverse link and the burst length of the forward link are equal, and a mode in which the burst length of the reverse link is longer than the burst length of the forward link.

19. The base station apparatus according to claim 17, wherein said plurality of communication modes include a mode in which the burst length of the reverse link is shorter than the burst length of the forward link, a mode in which the burst length of the reverse link is further shorter than the burst length of the forward link and a mode in which the burst length of the reverse link and the burst length of the forward link are equal.

20. The base station apparatus according to claim 17, wherein said plurality of communication modes include a mode in which the burst length of the reverse link is longer than the burst length of the forward link, a mode in which the burst length of the reverse link is further longer than the burst length of the forward link and a mode in which the burst length of the reverse link and the burst length of the forward link are equal.

21. The base station apparatus according to claim 17, wherein the burst length is changed by increasing and decreasing at least one of communication control bits, a code rate of an error correction code or a spreading factor.

22. In a base station apparatus for radio communicating with a mobile station apparatus by switching a reverse link and a forward link in a CDMA system, said base station apparatus comprising the radio communication apparatus according to claim 1.

23. A base station apparatus for radio communicating with a mobile station apparatus by switching a reverse link and a forward link in a CDMA system comprising:

providing means for providing a plurality of modulation processing data and a plurality of demodulation processing data each corresponding to a plurality of communication modes to communicate by switching the reverse link and the forward link at a certain ratio, wherein said certain ratios differ between communication modes;

a modulator for modulating transmission data according to the modulation processing data provided from said providing means;

a demodulator for demodulating reception data according to the demodulation processing data provided from said providing means;

means for monitoring a communication quality of the reverse link and a communication quality of the forward link, and outputting a mode switching signal to switch a communication mode corresponding to a communication quality, and a switch for switching the modulation processing data and the demodulation processing data each to be provided to said modulator and said demodulator respectively from said providing means according to the said mode switching signal.

24. A method for radio communicating by switching a reverse link and a forward link in a CDMA system comprising the steps of:
   controlling a relative ratio of burst lengths between the reverse link and the forward link corresponding to a communication quality;
   switching the reverse link and the forward link corresponding to the burst length of the reverse link and the burst length of the forward link; and
   changing the number of bits of specific data included in a burst of transmission data corresponding to the burst length of a communication link to be transmitted.

* * * * *

UNITED STATES PATENT AND TRADEMARK OFFICE
CERTIFICATE OF CORRECTION

PATENT NO.  : 6,404,778 B1
DATED       : June 11, 2002
INVENTOR(S) : M. Hayashi et al.

It is certified that error appears in the above-identified patent and that said Letters Patent is hereby corrected as shown below:

<u>Title page,</u>
Item [57], ABSTRACT,
Line 6, "Link" should be -- link --.

<u>Column 52,</u>
Line 20, "among from" should be -- from among --.

<u>Column 53,</u>
Line 35, "or" should be -- for --.

Signed and Sealed this

Thirty-first Day of December, 2002

JAMES E. ROGAN
*Director of the United States Patent and Trademark Office*